(12) United States Patent
Kawabe

(10) Patent No.: US 11,462,138 B2
(45) Date of Patent: Oct. 4, 2022

(54) IMAGE GENERATION DEVICE, IMAGE GENERATION METHOD, AND PROGRAM

(71) Applicant: NIPPON TELEGRAPH AND TELEPHONE CORPORATION, Tokyo (JP)

(72) Inventor: Takahiro Kawabe, Tokyo (JP)

(73) Assignee: NIPPON TELEGRAPH AND TELEPHONE CORPORATION, Tokyo (JP)

( * ) Notice: Subject to any disclaimer, the term of this patent is extended or adjusted under 35 U.S.C. 154(b) by 0 days.

(21) Appl. No.: 17/279,022

(22) PCT Filed: Sep. 13, 2019

(86) PCT No.: PCT/JP2019/036006
§ 371 (c)(1),
(2) Date: Mar. 23, 2021

(87) PCT Pub. No.: WO2020/066674
PCT Pub. Date: Apr. 2, 2020

(65) Prior Publication Data
US 2022/0044603 A1    Feb. 10, 2022

(30) Foreign Application Priority Data
Sep. 27, 2018  (JP) .............................. JP2018-181584

(51) Int. Cl.
*G09G 3/00* (2006.01)
*G09G 3/34* (2006.01)

(52) U.S. Cl.
CPC ............. *G09G 3/004* (2013.01); *G09G 3/003* (2013.01); *G09G 3/3426* (2013.01)

(58) Field of Classification Search
CPC ........ G09G 3/004; G09G 3/003; G09G 3/3426
See application file for complete search history.

(56) References Cited

U.S. PATENT DOCUMENTS

2014/0362258 A1* 12/2014 Ichikawa ........... H04N 5/23229
348/240.1

FOREIGN PATENT DOCUMENTS

JP    2001-155180 A    6/2001
JP    2001-356781 A    12/2001
(Continued)

OTHER PUBLICATIONS

Shapiro et al. (2005) "Visual illusions based on single-field contrast asynchronies," [online], Nov. 2005, Journal of Vision, 5(10), 2-2, [searched on Sep. 10, 2018], Internet <https://doi.org/10.1167/5.10.2>.

(Continued)

*Primary Examiner* — Towfiq Elahi

(57) ABSTRACT

A feeling is given that a stationary object having any contour shape is moving. An image generation device comprises means for generating video including a stationary object area, at least one luminance varying area located along a contour of the stationary object area, and a background area other than the stationary object area and the luminance varying area. Luminance of the luminance varying area varies with time in a luminance range based on luminance of the stationary object area and luminance of the background area, and the luminance varying area is a portion that does not overlap the stationary object area in at least one area obtained by moving and/or enlarging the stationary object area.

6 Claims, 19 Drawing Sheets

(56) References Cited

FOREIGN PATENT DOCUMENTS

| JP | 2003-108111 A | | 4/2003 |
|---|---|---|---|
| JP | 2003108111 A | * | 4/2003 |
| JP | 2014-239382 A | | 12/2014 |
| JP | 2015032966 A | * | 2/2015 |

OTHER PUBLICATIONS

Program [uploaded on May 4, 2018], Vision Sciences Society Program, 18th Annual meeting, May 18-23, 2018, Internet Retrieved from: https://www.visionsciences.org/program-abstracts-books-now-availableonline/> https://www.visionsciences.org/programs/VSS_2018_Program.pdf.

Demo Video [uploaded on May 24, 2018],"Cast shadows add dimensions", NTT Communication Science Laboratories, Internet, Retrieved from: https://www.youtube.com/watch?v=ztqhAYp72Ww, with translation generated by machine.

Demo Video [uploaded on May 29, 2018],"Danswing papers", NTT Communication Science Laboratories, Internet, Retrieved from: https://www.youtube.com/watch?v=HVeCECoHwMw, with translation generated by machine.

Publication [uploaded on May 31, 2018], Takehiro Kawabe, "Cast shadows add dimensions; Projection mapping giving depth illusion to real objects" NTT Communication Science Laboratories Open House 2018, with partial translation generated by machine.

Poster presentation [demonstrated on May 31, 2018], Takehiro Kawabe, "Cast shadows add dimensions; Projection mapping giving depth illusion to real objects" NTT Communication Science Laboratories Open House 2018, with partial translation.

Program and Abstract [published on Jul. 20, 2018], Program and abstract of 2018 summer meeting; the Vision Society of Japan, Aug. 1-3, 2018 http://www.cp.is.tohoku.ac.jp/~VSJ2018summer/program.html; http://www.cp.is.tohoku.ac.jp/~VSJ2018summer/img/file4.pdf; http://www.cp.is.tohoku.ac.jp/~VSJ2018summer/img/file5.pdf, with partial translation generated by machine.

Poster presentation [demonstrated on Aug. 3, 2018], Takehiro Kawabe, "Cast Shadow add dimension", a light projection method that gives a depth impression to objects drawn on a plane by using cast shadows, 2018 summer meeting; the Vision Society of Japan, Aug. 1-3, 2018, with partial translation generated by machine.

* cited by examiner (a)

(b)

IMAGE GENERATION DEVICE, IMAGE GENERATION METHOD, AND PROGRAM

CROSS-REFERENCE TO RELATED APPLICATIONS

This application is a U.S. 371 Application of International Patent Application No. PCT/JP2019/036006, filed on 13 Sep. 2019, which application claims priority to and the benefit of JP Application No. 2018-181584, filed on 27 Sep. 2018, the disclosures of which are hereby incorporated herein by reference in their entireties.

TECHNICAL FIELD

The present invention relates to a technique for giving a feeling that an object which is not actually moving is moving.

BACKGROUND ART

Non-Patent Literature 1 discloses that a feeling that the stationary object is moving (the illusion that it is moving) is given, on the assumption that a screen area 40 having a certain luminance includes a stationary object area 10, which is a quadrangular area having a different luminance, on a screen such as a CRT display or an LCD display as shown in FIG. 16(a) and FIG. 17(a), when a first luminance varying area 30a and a second luminance varying area 30b, which are areas where luminance is varied with time, are respectively provided along two facing sides of the four sides of the stationary object area 10 (in the example of the figures, the two left and right sides) as shown in FIG. 16(b) and FIG. 17(b), the remaining area is set to a background area 20 still having the original luminance of the screen area 40, and each of the first luminance varying area 30a and the second luminance varying area 30b is given time variation in luminance across the luminance of the background area 20, that is, time variation in luminance within the range from a luminance lower than the luminance of the background area 20 to a luminance higher than the luminance of the background area 20.

The technique of Non-Patent Literature 1 in the case where the luminance of the stationary object area 10 is brighter than the luminance of the background area 20 will be described with reference to FIGS. 16(c)-(d). FIG. 16(c) is a diagram showing the relationship between the luminance of each area and time. The axis of ordinates represents relative luminance in the case where the luminance of the stationary object area 10 is set to a relative luminance of 1, and a luminance value of 0, which is the lowest luminance, is set to a relative luminance of 0. The axis of abscissas represents the frame number in video presented by a display. The luminance of the first luminance varying area 30a adjacent to the left side of the stationary object area 10 and the luminance of the second luminance varying area 30b adjacent to the right side of the stationary object area 10 are varying with time, with the luminance of the background area 20 set to a relative luminance of 0.5 as the center, sinusoidally between the lowest luminance and the highest luminance equal to the luminance of the stationary object area 10 so as to be in antiphase with respect to time. FIG. 16(d) shows the luminance ranges of the stationary object area 10, the background area 20, the first luminance varying area 30a, and the second luminance varying area 30b. In Non-Patent Literature 1, when the luminance of the stationary object area 10 is brighter than the luminance of the background area 20 as shown in FIG. 16(a), the first luminance varying area 30a and the second luminance varying area 30b are arranged as shown in FIG. 16(b), and the luminances of these luminance varying areas are varied with time as shown in FIG. 16(c) so as to give a feeling that the stationary object area 10 is periodically moving to right and left (give the illusion that it is moving).

The technique of Non-Patent Literature 1 in the case where the luminance of the stationary object area 10 is darker than the luminance of the background area 20 will be described with reference to FIGS. 17(c)-(d). FIG. 17(c) is a diagram showing the relationship between the luminance of each area and time. The axis of ordinates represents relative luminance in the case where the luminance of the stationary object area 10 is set to a relative luminance of 0 and a predetermined highest luminance is set to a relative luminance of 1. The axis of abscissas represents the frame number in video presented by the display. The luminance of the first luminance varying area 30a adjacent to the left side of the stationary object area 10 and the luminance of the second luminance varying area 30b adjacent to the right side of the stationary object area 10 are varying with time, with the luminance of the background area 20 set to a relative luminance of 0.5 as the center, sinusoidally between the lowest luminance equal to the luminance of the stationary object area 10 and the highest luminance so as to be in antiphase with respect to time. FIG. 17(d) shows the luminance ranges of the stationary object area 10, the background area 20, the first luminance varying area 30a, and the second luminance varying area 30b. In Non-Patent Literature 1, when the luminance of the stationary object area 10 is darker than the luminance of the background area 20 as shown in FIG. 17(a), the first luminance varying area 30a and the second luminance varying area 30b are arranged as shown in FIG. 17(b), and the luminances of these luminance varying areas are varied with time as shown in FIG. 17(c), so as to give a feeling that the stationary object area 10 is periodically moving to right and left.

CITATION LIST

Non-Patent Literature

Non-Patent Literature 1: Shapiro, A. G., Charles, J. P., & Shear-Heyman, M., "Visual illusions based on single-field contrast asynchronies," [online], November 2005, Journal of Vision, 5(10), 2-2, [searched on Sep. 10, 2018], Internet <https://doi.org/10.1167/5.10.2>

SUMMARY OF THE INVENTION

Technical Problem

Non-Patent Literature 1 discloses only a technique for giving a feeling that a stationary quadrangle is moving and does not disclose a technique for giving a feeling that a stationary object other than a quadrangle is moving. The present invention has been made in view of the above circumstances, and an object thereof is to provide a technique for giving a feeling that a stationary object having any contour shape is moving.

Means for Solving the Problem

An image generation device generates video including a stationary object area, at least one luminance varying area located along a contour of the stationary object area, and a background area other than the stationary object area and the luminance varying area. Luminance of the luminance varying area varies with time in a luminance range based on luminance of the stationary object area and luminance of the background area, and the luminance varying area is a portion that does not overlap the stationary object area in at least one area obtained by moving and/or enlarging the stationary object area.

Effects of the Invention

This makes it possible to give a feeling that a stationary object having any contour shape is moving.

BRIEF DESCRIPTION OF DRAWINGS

FIG. 16(a) is a diagram schematically illustrating an image in which a stationary object area is provided in a screen area. FIG. 16(b) is a diagram schematically illustrating an example in which the first luminance varying area and the second luminance varying area are set in the image in FIG. 16(a).

FIGS. 16(c)-(d) are diagrams illustrating each of the luminances of the stationary object area, the background area, the first luminance varying area, and the second luminance varying area included in video for presentation.

FIG. 17(a) is a diagram schematically illustrating an image in which a stationary object area is provided in the screen area. FIG. 17(b) is a diagram schematically illustrating an example in which the first luminance varying area and the second luminance varying area are set in the image in FIG. 17(a).

FIGS. 17(c)-(d) are diagrams illustrating each of the luminances of the stationary object area, the background area, the first luminance varying area, and the second luminance varying area included in video for presentation.

DETAILED DESCRIPTION OF THE INVENTION

Embodiments of the present invention will be described below with reference to the drawings.

First Embodiment

In a first embodiment, an embodiment will be described that generates and presents video that gives a feeling that a stationary object in any shape that looks brighter than a background area is moving.

<<Image Generation Device 100>>

Figure 1:
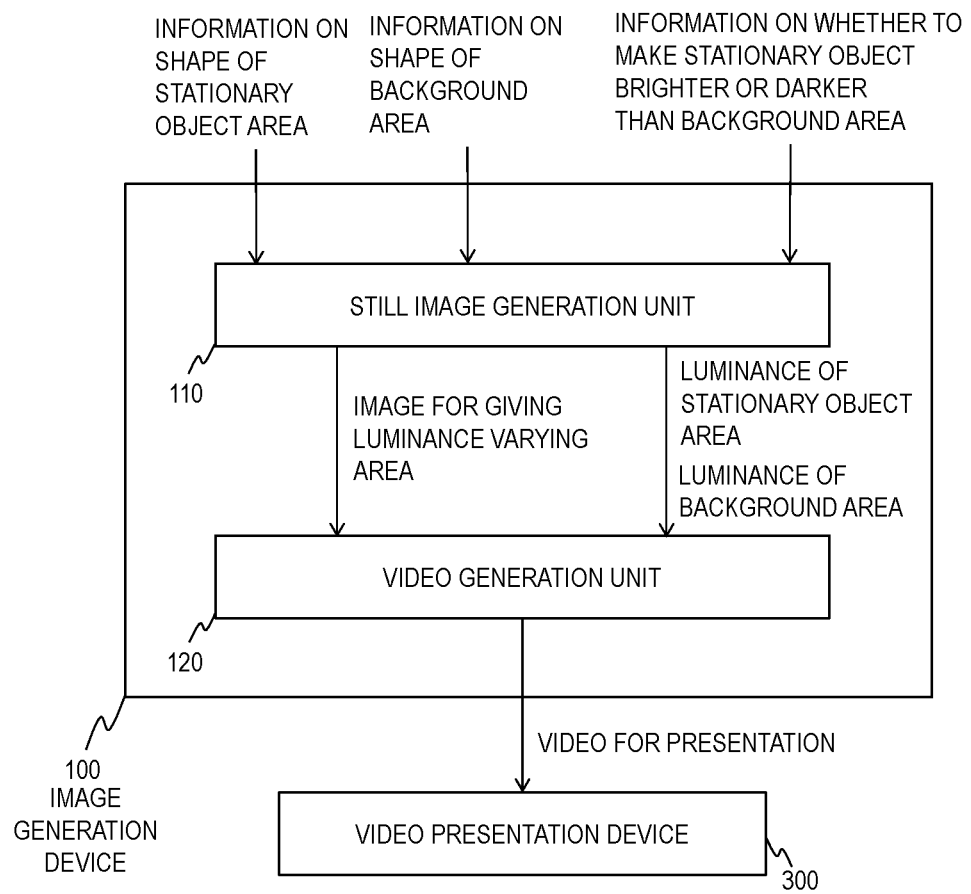
FIG. 1 is a block diagram for illustrating image generation devices of first to fifth embodiments.
Figure 2:
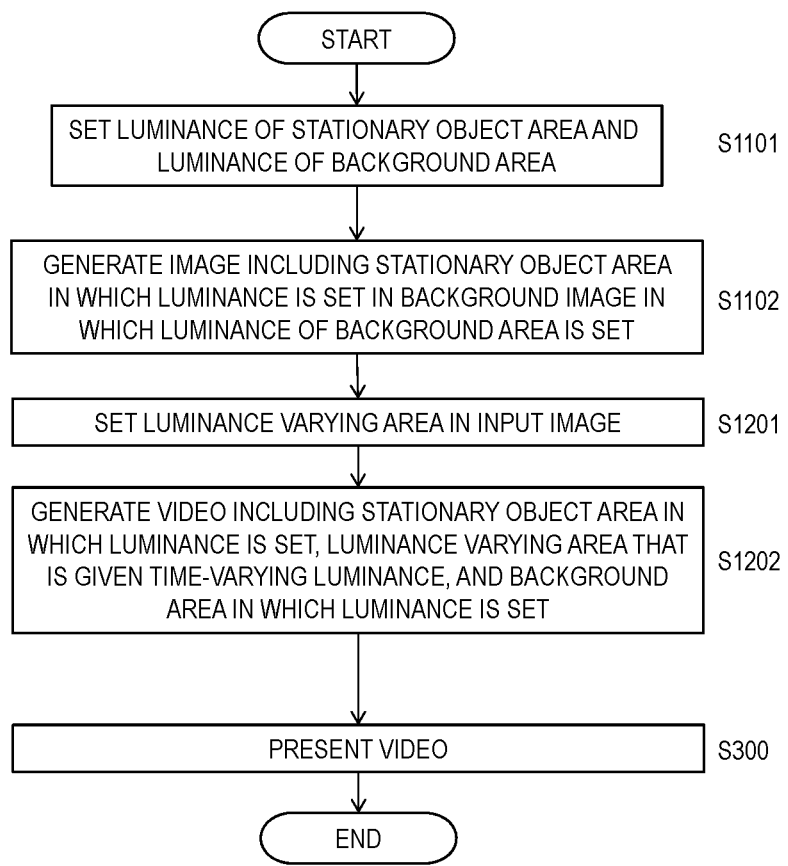
FIG. 2 is a flow diagram for illustrating image generation methods of the first to fifth embodiments.

As illustrated in FIG. 1, an image generation device 100 of this embodiment generates and outputs video for presentation and comprises a still image generation unit 110 and a video generation unit 120. The operation of the image generation device 100 will be described below with further reference to FIGS. 2-3.

<Still Image Generation Unit 110>

The still image generation unit 110 generates and outputs an image 1' for giving luminance varying areas including a stationary object area 10 in any shape and an image area 20' other than the stationary object area. The still image generation unit 110 performs, for example, step S1101 and step S1102 below.

Step S1101: The still image generation unit 110 sets the luminance of the stationary object area 10 and the luminance of the background area 20 so that the luminance of the stationary object area 10 is brighter than the luminance of the background area 20. At that time, the luminances themselves of the stationary object area 10 and the background area 20 to be set or the magnitude relationship between the luminance of the stationary object area 10 and the luminance of the background area 20 may be input from unillustrated input means provided in the image generation unit 100 as "information regarding whether to make the stationary object brighter or darker than the background area", or the still image generation unit 110 may use the one stored in an unillustrated storage unit in the image generation device 100. Since the luminance of the stationary object area 10 and the luminance of the background area 20 that are set are used in step S1102 to be performed next and are also used in the video generation unit 120, they are output to the video generation unit 120.

Figure 3:
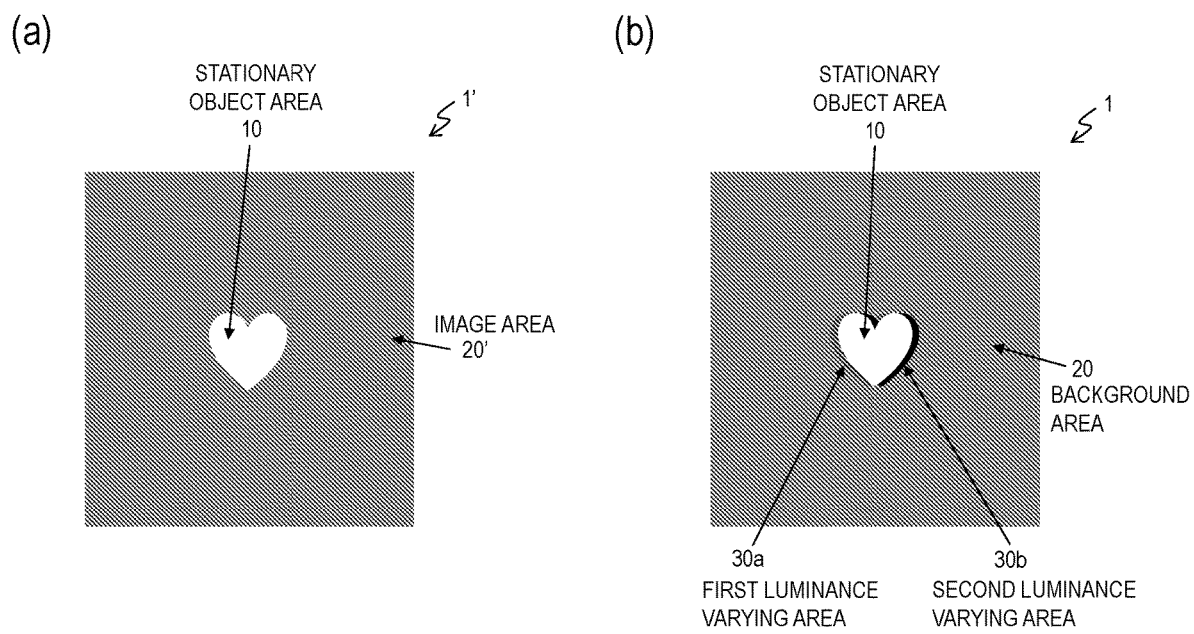
FIG. 3(a) is a diagram schematically illustrating an image for giving luminance varying areas generated by a still image generation unit of the first embodiment.
FIG. 3(b) is a diagram schematically illustrating an example in which a first luminance varying area and a second luminance varying area are set in the image for giving luminance varying areas in FIG. 3(a).

Step S1102: The still image generation unit 110 first generates a background image having the luminance of the background area 20 that is set in step S1101 (step S1102-1). The pair of the number of pixels in the horizontal direction and the number of pixels in the vertical direction of the background image may be set to a pair of the number of pixels in the horizontal direction and the number of pixels in the vertical direction that can be presented by a video presentation device 300 described later. Information regarding the number of pixels described above may be input from the unillustrated input means provided in the image generation device 100 as "information on the shape of the background area". Its corresponding information stored in the unillustrated storage unit in the image generation device 100 may be used. Next, the still image generation unit 110 draws a figure having the luminance of the stationary object area 10 set in step S1101 near the center of the background image generated in step S1102-1 to generate and output the image 1' for giving luminance varying areas (step S1102-2). For example, the center (centroid) of the figure to be drawn and the center (centroid) of the background image may be located at the same position. FIG. 3(*a*) is a diagram schematically showing the image 1' for giving luminance varying areas generated by the still image generation unit 110. The figure to be drawn may have any shape. The figure to be drawn may be input from the unillustrated input means provided in the image generation device 100 as "information on the shape of the stationary object area", or a figure to be drawn that is stored in the unillustrated storage unit in the image generation device 100 may be used. Note that the image area of the drawn figure is the stationary object area 10.

<Video Generation Unit 120>

The video generation unit 120 generates and outputs an image 1 for presentation by providing a luminance varying area, in which the luminance varies with time in a luminance range based on the luminance of the stationary object area 10 and the luminance of the background area 20 input from the still image generation unit 110, in the image 1' for giving luminance varying areas input from the still image generation unit 110. The video generation unit 120 performs, for example, step S1201 and step S1202 below.

A movement amount $D_L$ and a movement amount $D_R$ are used in step S1201 performed by the video generation unit 120. The movement amount $D_L$ and the movement amount $D_R$ may be input from the unillustrated input means provided in the image generation device 100, or those stored in the unillustrated storage unit in the image generation device 100 may be used. Since the movement amount $D_L$ and the movement amount $D_R$ are usually set to the same value, the same single value may be input or stored in advance, but they may be different values, and each value can be input or stored in advance.

Step S1201: The video generation unit 120 shifts the stationary object area 10 to the left by the movement amount $D_L$ to obtain an area having the same shape as the stationary object area 10 (step S1201-1). Then, the video generation unit 120 sets an area that does not overlap the stationary object area 10 in the area obtained in step S1201-1 as a luminance varying area (step S1201-2). The luminance varying area set in step S1201-2 will hereinafter be referred to as a first luminance varying area 30*a*. Further, the video generation unit 120 shifts the stationary object area 10 to the right by the movement amount $D_R$ to obtain an area having the same shape as the stationary object area 10 (step S1201-3). Then, the video generation unit 120 sets an area that does not overlap the stationary object area 10 in the area obtained in step S1201-3 as a luminance varying area (step S1201-4). The luminance varying area set in step S1201-4 will hereinafter be referred to as a second luminance varying area 30*b*.

Note that depending on the shape of the stationary object area 10, the area that does not overlap the stationary object area 10 in the area obtained in step S1201-1 and the area that does not overlap the stationary object area 10 in the area obtained in step S1201-3 may have an overlapping area. In this case, the overlapping area may be included in either the first luminance varying area 30*a* or the second luminance varying area 30*b*, but the overlapping area may be set as a third luminance varying area 30*c*.

Further, without division into two steps: step S1201-1 and step S1201-2, the video generation unit 120 may set an area that does not overlap the stationary object area 10 in the area having the same shape as the stationary object area 10 obtained by shifting the stationary object area 10 to the left by the movement amount $D_L$ as a first luminance varying area 30*a*. Similarly, without division into two steps: step S1201-3 and step S1201-4, the video generation unit 120 may set an area that does not overlap the stationary object area 10 in the area having the same shape as the stationary object area 10 obtained by shifting the stationary object area 10 to the right by the movement amount $D_R$ as the second luminance varying area 30*b*. Note that the area that is none of the stationary object area 10, the first luminance varying area 30*a*, and the second luminance varying area 30*b* is the background area 20. FIG. 3(*b*) is a diagram schematically showing an example in which the first luminance varying area 30*a* and the second luminance varying area 30*b* are set in the image 1' for giving luminance varying areas in FIG. 3(*a*).

Note that the maximum value of the width of each luminance varying area is desirably set so that when the video presentation device 300 described later presents video generated by the image generation device 100, the viewing angle of a person who views the video is 0.2 degrees or its vicinity. For example, when it is set assuming that the video presented by the video presentation device 300 is viewed from a position about 100 cm away, the maximum value of the width of each luminance varying area, that is, the above-described movement amount is desirably set to about 3.5 mm. However, the movement amount is optional, and may be set so that the maximum viewing angle of the width of the luminance varying area is other than the vicinity of 0.2 degrees. Note that, as the maximum viewing angle of the width of the luminance varying area expands to 0.2 degrees or more or narrows to 0.2 degrees or less, the illusion effect that gives a feeling that the stationary object is moving decreases.

Step S1202: The video generation unit 120 varies with time the luminance of the luminance varying area set in step S1201 based on the luminance of the stationary object area 10 and the luminance of the background area 20 input from the still image generation unit 110 to generate and output the video 1 for presentation. The maximum value of the time-varying luminance of the luminance varying area is set to a value larger than the luminance of the background area 20 and smaller than or equal to the luminance of the stationary object area 10. The minimum value of the time-varying luminance of the luminance varying area is set to a value smaller than the maximum value of the time-varying luminance of the luminance varying area. The time variation in the luminance varying area may be sinusoidal or triangular, and the change in luminance with time may be non-linear or linear. Further, the time variation in the luminance varying area may be periodical or may be monotonically increasing or monotonically decreasing. For example, the video presentation device 300 presents the video 1 for presentation in which the luminances of the two luminance varying areas which are the first luminance varying area 30a and the second luminance varying area 30b are periodically varied by the video generation unit 120. In this case, the image generation device 100 sets the phase difference between the variations in luminance of the two luminance varying areas to 180 degrees, thereby allowing a person who views the image to feel as if the stationary object is moving in the direction of the luminance varying area whose luminance gets closer to the luminance of the stationary object area 10, and to feel as if the stationary object is periodically moving to right and left. For example, as shown in FIG. 16(c), the maximum value of the luminance of the first luminance varying area 30a and the maximum value of the luminance of the second luminance varying area 30b are set to the same value as the luminance of the stationary object area 10, the minimum value of the luminance of the first luminance varying area 30a and the minimum value of the luminance of the second luminance varying area 30b are set to 0, and the time variation in luminance of the first luminance varying area 30a and the time variation in luminance of the second luminance varying area 30b are set to be in a sine wave shape with a phase difference of 180 degrees (antiphase), thereby allowing the viewer to feel as if the stationary object is periodically moving to right and left. Further, for example, the image generation device 100 sets the phase difference between the periodic time variation in luminance of the first luminance varying area 30a and the periodic time variation in luminance of the second luminance varying area 30b to 0 degrees, thereby allowing the viewer to feel the enlarging and reducing motion of the stationary object. Note that when the luminance of the luminance varying area is periodically increased or decreased like a sine wave, the temporal frequency of the periodic variation in luminance of the luminance varying area in the video 1 for presentation is set to be larger than or equal to 0.25 Hz and less than or equal to 2 Hz.

Note that when the overlapping area is set as the third luminance varying area 30c in step S1201, the video generation unit 120, in addition to varying with time the luminance of the first luminance varying area 30a and the luminance of the third luminance varying area 30b as described above, sets the average value of the luminance of the first luminance varying area 30a and the luminance of the second luminance varying area 30b as the luminance of the third luminance varying area 30c at each time, thereby generating and outputting the video 1 for presentation. Note that when the time variation in luminance of the first luminance varying area 30a and the time variation in luminance of the second luminance varying area 30b are set to have the same amplitude and to be in antiphase, the luminance of the third luminance varying area 30c does not vary with time exceptionally.

<<Video Presentation Device 300>>

As shown in FIG. 3, the video 1 for presentation that is generated and output by the image generation device 100 is input to the video presentation device 300. The video presentation device 300 is a device for making input video visible to a user, such as a CRT display, an LCD display, and a video projector. The video presentation device 300 outputs the input video 1 for presentation so that the user can visually recognize it (step S300).

Although FIG. 3 has been described taking the stationary object area 10 in a heart shape as an example, the shape of the stationary object area 10 is not limited to a heart, and the video generation unit 120 of the image generation device 100 may be caused to perform the operation of this embodiment, whatever shape the stationary object area 10 has, thereby generating the video 1 for presentation that gives a feeling that the stationary object is moving.

Further, in step S1201-1 and step S1201-3 described above, the example in which the stationary object area 10 is shifted to right and left has been described, but the stationary object area 10 may be shifted in a direction and in the direction opposite to the direction, for example, the stationary object area 10 may be shifted up and down.

Second Embodiment

The second embodiment describes an embodiment that generates and presents a video of an arbitrarily shaped stationary object that appears darker than the background area but gives the impression that it is moving. The configuration of an image generation device of the second embodiment is the same as that of the image generation device of the first embodiment illustrated in FIG. 1. Differences of the second embodiment from the first embodiment are step S1101 performed by the still image generation unit 110 and step S1202 performed by the video generation unit 120. The differences of the second embodiment from the first embodiment will be described below.

Step S1101: A point of Step S1101 in the second embodiment different from step S1101 in the first embodiment is that the still image generation unit 110 sets the luminance of the stationary object area 10 and the luminance of the background area 20 so that the luminance of the stationary object area 10 is darker than the luminance of the background area 20. Except for this, it is the same as step S1101 in the first embodiment.

Figure 4:
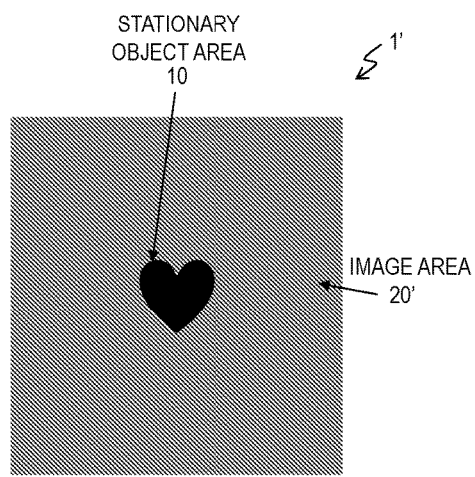
FIG. 4(a) is a diagram schematically illustrating an image for giving luminance varying areas generated by a still image generation unit of the second embodiment.
FIG. 4(b) is a diagram schematically illustrating an example in which a first luminance varying area and a second luminance varying area are set in the image for giving luminance varying areas in FIG. 4(a).
Figure 4:
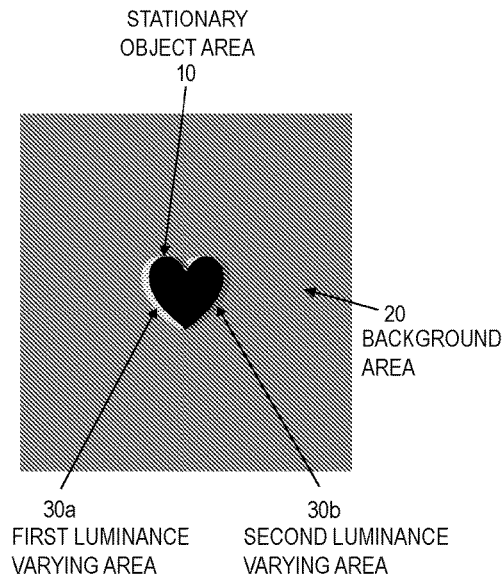

FIG. 4(a) is a diagram schematically showing the image 1' for giving luminance varying areas generated by the still image generation unit 110. FIG. 4(b) is a diagram schematically showing an example in which the video generation unit 120 sets the first luminance varying area 30a and the second luminance varying area 30b in the image 1' for giving luminance varying areas in FIG. 4(a) using the same step S1201 as in the first embodiment.

Step S1202: A point of Step S1202 in the second embodiment different from step S1202 in the first embodiment is that the minimum value of the time-varying luminance of the luminance varying area is set to a value smaller than the luminance of the background area 20 and larger than or equal to the luminance of the stationary object area 10, and the maximum value of the time-varying luminance of the luminance varying area is set to a value larger than the minimum value of the time-varying luminance of the luminance varying area. Except for this, it is the same as step S1202 in the first embodiment.

For example, as shown in FIG. 17(c), the minimum value of the luminance of the first luminance varying area 30a and the minimum value of the luminance of the second luminance varying area 30b are set to the same value as the luminance of the stationary object area 10, the maximum value of the luminance of the first luminance varying area 30a and the maximum value of the luminance of the second luminance varying area 30b are set to the maximum representable luminance value, and the time variation in luminance of the first luminance varying area 30a and the time variation in luminance of the second luminance varying area 30b are set to be in a sine wave shape with a phase difference of 180 degrees (antiphase), thereby allowing the viewer to feel as if the stationary object is periodically moving to right and left. Further, for example, by setting the phase difference between the periodic time variation in luminance of the first luminance varying area 30a and the periodic time variation in luminance of the second luminance varying area 30b to 0 degrees, the image generation unit 100 can make the viewer feel the movement of a stationary object expanding and contracting.

Third Embodiment

In a third embodiment, another embodiment will be described that generates and presents video that gives a feeling that a stationary object in any shape is moving. The configuration of an image generation device of the third embodiment is the same as those of the image generation devices of the first embodiment and the second embodiment illustrated in FIG. 1. A difference of the third embodiment from the first embodiment and the second embodiment is step S1201 performed by the video generation unit 120. The difference of the third embodiment from the first embodiment and the second embodiment will be described below.

A rotation amount $\theta_L$ and a rotation amount $\theta_R$ are used in step S1201 performed by the video generation unit 120 of the third embodiment. The rotation amount $\theta_L$ and the rotation amount $\theta_R$ are values representing angles of rotation and may be input from the unillustrated input means provided in the image generation device 100, or ones stored in the unillustrated storage unit in the image generation device 100 may be used. Since the rotation amount $\theta_L$ and the rotation amount $\theta_R$ are generally set to the same value, the same single value may be input or stored in advance, but the rotation amount $\theta_L$ and the rotation amount $\theta_R$ may be different values, and each value may be input or stored in advance.

Step S1201: The video generation unit 120 rotates the stationary object area 10 counterclockwise about a certain center point by the rotation amount $\theta_L$ to obtain an area having the same shape as the stationary object area 10 (step S1201-1). Then, the video generation unit 120 sets an area that does not overlap the stationary object area 10 in the area obtained in step S1201-1 as a luminance varying area (step S1201-2). The luminance varying area set in step S1201-2 will hereinafter be referred to as a first luminance varying area 30a. Further, the video generation unit 120 rotates the stationary object area 10 clockwise about the same center point as in step S1201 by the rotation amount OR to obtain an area having the same shape as the stationary object area 10 (step S1201-3). Then, the video generation unit 120 sets an area that does not overlap the stationary object area 10 in the area obtained in step S1201-3 as a luminance varying area (step S1201-4). The luminance varying area set in step S1201-4 will hereinafter be referred to as a second luminance varying area 30b.

Note that depending on the shape of the stationary object area 10, the area that does not overlap the stationary object area 10 in the area obtained in step S1201-1 and the area that does not overlap the stationary object area 10 in the area obtained in step S1201-3 may have an overlapping area. In this case, the overlapping area may be included in either the first luminance varying area 30a or the second luminance varying area 30b, but the overlapping area may be set as a third luminance varying area 30c.

Further, without division into two steps: step S1201-1 and step S1201-2, the video generation unit 120 may set an area that does not overlap the stationary object area 10 in the area having the same shape as the stationary object area 10 obtained by rotating the stationary object area 10 counterclockwise about the certain center point by the rotation amount OL as the first luminance varying area 30a. Similarly, without division into two steps: step S1201-3 and step S1201-4, the video generation unit 120 may set the area that does not overlap the stationary object area 10 in the area having the same shape as the stationary object area 10 obtained by rotating the stationary object area 10 clockwise about the same center point by the rotation amount OR as the second luminance varying area 30b. While the center point of rotation may be set to the centroid of the stationary object area 10 but may be set to be other than the centroid of the stationary object area 10, or may be configured to be specified by inputting from the unillustrated input means provided in the image generation device 100. The well-known affine transform may be used for the process of rotating an image area.

FIG. 5(a) is a diagram schematically showing the image 1' for giving luminance varying areas generated by the still image generation unit 110 of the third embodiment. FIG. 5(b) is a diagram schematically showing an example in which the video generation unit 120 sets the first luminance varying area 30a and the second luminance varying area 30b in the image 1' for giving luminance varying areas in FIG. 5(a) using step S1201 in the third embodiment.

The rotation amount is set so that, when the video generated by the image generation device 100 is presented by the video presentation device 300, the maximum value of the width of the luminance varying area corresponds to the viewing angle of 0.2 degrees or its vicinity of a person who views the video. For example, when it is set assuming that the video presented by the video presentation device 300 is viewed from a position about 100 cm away, it is desirable to set the rotation amount so that the maximum value of the width of the luminance varying area is about 3.5 mm. However, the rotation amount is optional, and may be set so that the maximum viewing angle of the width of the luminance varying area is other than the vicinity of 0.2 degrees. Note that, as the maximum viewing angle of the width of the luminance varying area expands to 0.2 degrees or more or narrows to 0.2 degrees or less, the illusion effect that gives a feeling that the stationary object is moving decreases.

Figure 5:
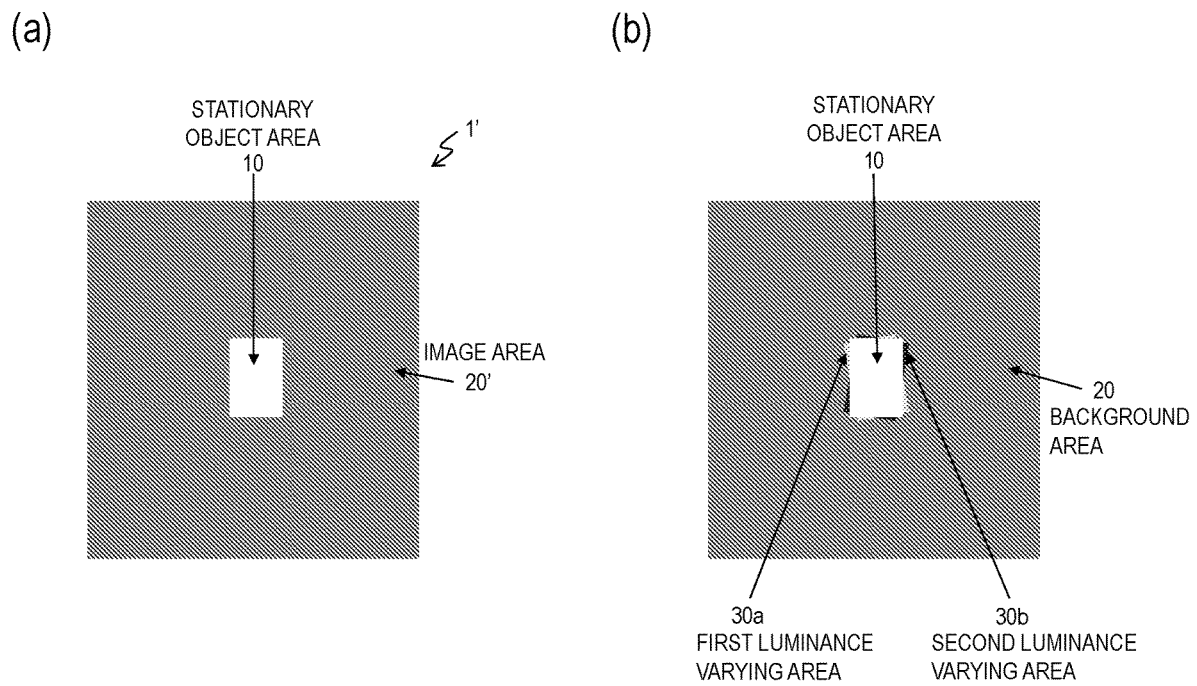
FIG. 5(a) is a diagram schematically illustrating an image for giving luminance varying areas generated by a still image generation unit of the third embodiment.
FIG. 5(b) is a diagram schematically illustrating an example in which a first luminance varying area and a second luminance varying area are set in the image for giving luminance varying areas in FIG. 5(a).

Although FIG. 5 has been described taking the stationary object area 10 in a quadrangular shape as an example, the shape of the stationary object area 10 is not limited to a quadrangle. Whatever shape the stationary object area 10 has, the image generation device 100 may be caused to perform the operation of this embodiment, thereby generating the video 1 for presentation that gives a feeling that the stationary object is moving.

Modifications of First Embodiment to Third Embodiment

In the first embodiment and the second embodiment, the luminance varying areas are arranged on the left and right sides of the stationary object area, respectively, and in the third embodiment, the luminance varying areas are arranged on the counterclockwise side and the clockwise side of the stationary object area, respectively. That is, in the first embodiment to the third embodiment, embodiments have been described in which the two luminance varying areas are located on the spatially opposite sides with respect to the stationary object area 10. However, in the first embodiment to the third embodiment, it is possible to use only either the first luminance varying area 30*a* or the second luminance varying area 30*b* and not to use the other luminance varying area. In this case, the video generation unit 120 may be configured to perform the process of setting a luminance varying area in step S1201 and the process of varying with time the luminance of the luminance varying area in S1202 only for either luminance varying area of the first luminance varying area 30*a* or the second luminance varying area 30*b*, and may be configured to input or store the movement amount or the rotation amount in advance.

Fourth Embodiment

In a fourth embodiment, yet another embodiment will be described that generates and presents video that gives a feeling that a stationary object in any shape is moving. The configuration of an image generation device of the fourth embodiment is the same as those of the image generation devices of the first embodiment to the third embodiment and their modifications illustrated in FIG. 1. The fourth embodiment is an embodiment that uses one luminance varying area as in the modifications of the third to third embodiments. A difference of the fourth embodiment from the modifications of the first embodiment to the third embodiment is step S1201 performed by the video generation unit 120. The difference of the fourth embodiment from the modifications of the first embodiment to the third embodiment will be described below.

An enlargement factor S is used in step S1201 performed by the video generation unit 120 of the fourth embodiment. The enlargement factor S may be input from the unillustrated input means provided in the image generation device 100, or may be one stored in the unillustrated storage unit in the image generation device 100.

Step S1201: The video generation unit 120 enlarges the stationary object area 10 at the enlargement factor S with a certain center point as the center to obtain an area having the same shape as the stationary object area 10 (step S1201-1). Then, the video generation unit 120 sets an area that does not overlap the stationary object area 10 in the area obtained in step S1201-1 as a luminance varying area (step S1201-2). Although one luminance varying area is set in this embodiment, the luminance varying area set in step S1201-2 will hereinafter be referred to as the first luminance varying area 30*a* for convenience. Note that without division into two steps: step S1201-1 and step S1201-2, the video generation unit 120 may set an area that does not overlap the stationary object area 10 in the area having the same shape as the stationary object area 10 obtained by enlarging the stationary object area 10 at the enlargement factor S with the certain center point as the center as the first luminance varying area 30*a*. The center point of enlargement may be set to the centroid of the stationary object area 10, but it may be set to be other than the centroid of the stationary object area 10 or may be specified by inputting it from the unillustrated input means provided in the image generation device 100. The well-known affine transform may be used for the process of enlarging an image area.

Figure 6:
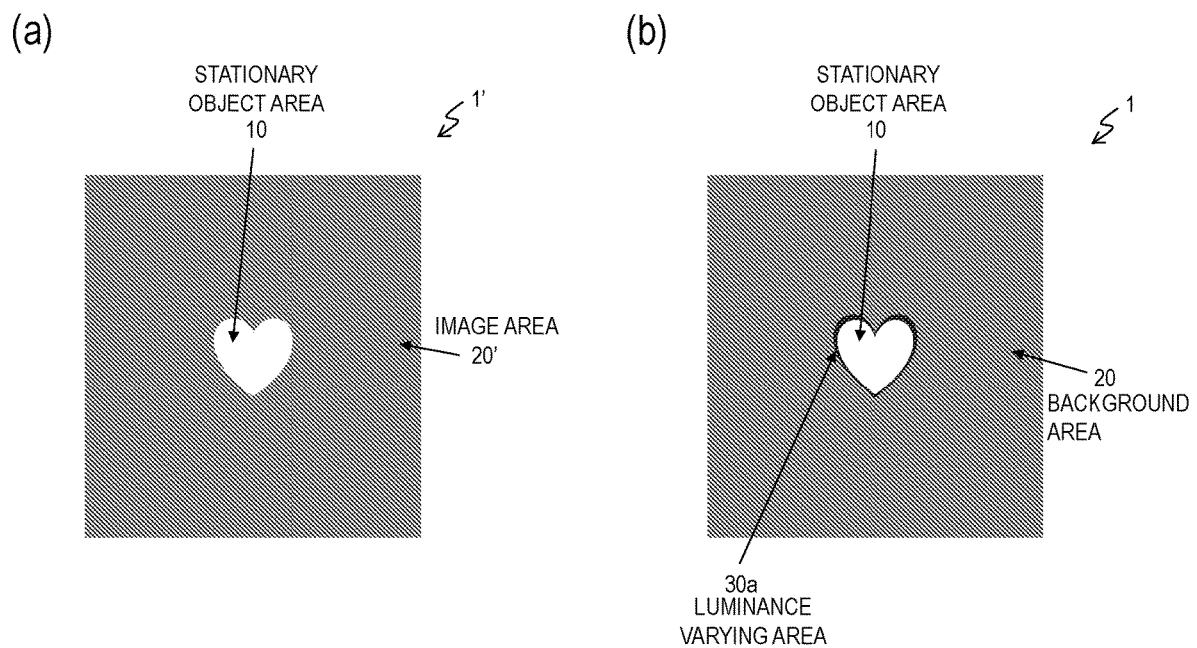
FIG. 6(a) is a diagram schematically illustrating an image for giving a luminance varying area generated by a still image generation unit of the fourth embodiment.
FIG. 6(b) is a diagram schematically illustrating an example in which a video generation unit of the fourth embodiment sets a first luminance varying area in the image for giving a luminance varying area in FIG. 6(a).

FIG. 6(*a*) is a diagram schematically showing the image 1' for giving a luminance varying area generated by the still image generation unit 110. FIG. 6(*b*) is a diagram schematically showing an example in which the video generation unit 120 sets the first luminance varying area 30*a* in the image 1' for giving a luminance varying area in FIG. 6(*a*) using step S1201 in the fourth embodiment.

The enlargement factor is set so that when the video generated by the image generation device 100 is presented by the video presentation device 300, the maximum value of the width of the luminance varying area corresponds to the viewing angle of 0.2 degrees or its vicinity of a person who views the video. For example, when it is set assuming that the video presented by the video presentation device 300 is viewed from a position about 100 cm away, it is desirable to set the enlargement factor so that the maximum value of the width of the luminance varying area is about 3.5 mm. However, the enlargement factor is optional, and may be set so that the maximum viewing angle of the width of the luminance varying area is other than the vicinity of 0.2 degrees. Note that, as the maximum viewing angle of the width of the luminance varying area expands to 0.2 degrees or more or narrows to 0.2 degrees or less, the illusion effect that gives a feeling that the stationary object is moving decreases.

Although FIG. 6 has been described taking the stationary object area 10 in a heart shape as an example, the shape of the stationary object area 10 is not limited to a heart, and the image generation device 100 may be caused to perform the operation of this embodiment whatever shape the stationary object area 10 has, thereby generating the video 1 for presentation that gives a feeling that the stationary object is moving.

Fifth Embodiment

In a fifth embodiment, still another embodiment will be described that generates and presents video that gives a feeling that a stationary object in any shape is moving. The configuration of an image generation device of the fifth embodiment is the same as those of the image generation devices of the respective embodiments and their modifications described above illustrated in FIG. 1. A difference of the fifth embodiment from the respective embodiments and their modifications described above is the time-varying luminance of the luminance varying area that is set in step S1202 performed by the video generation unit 120. The difference of the fifth embodiment from the respective embodiments and their modifications described above will be described below.

Figure 7:
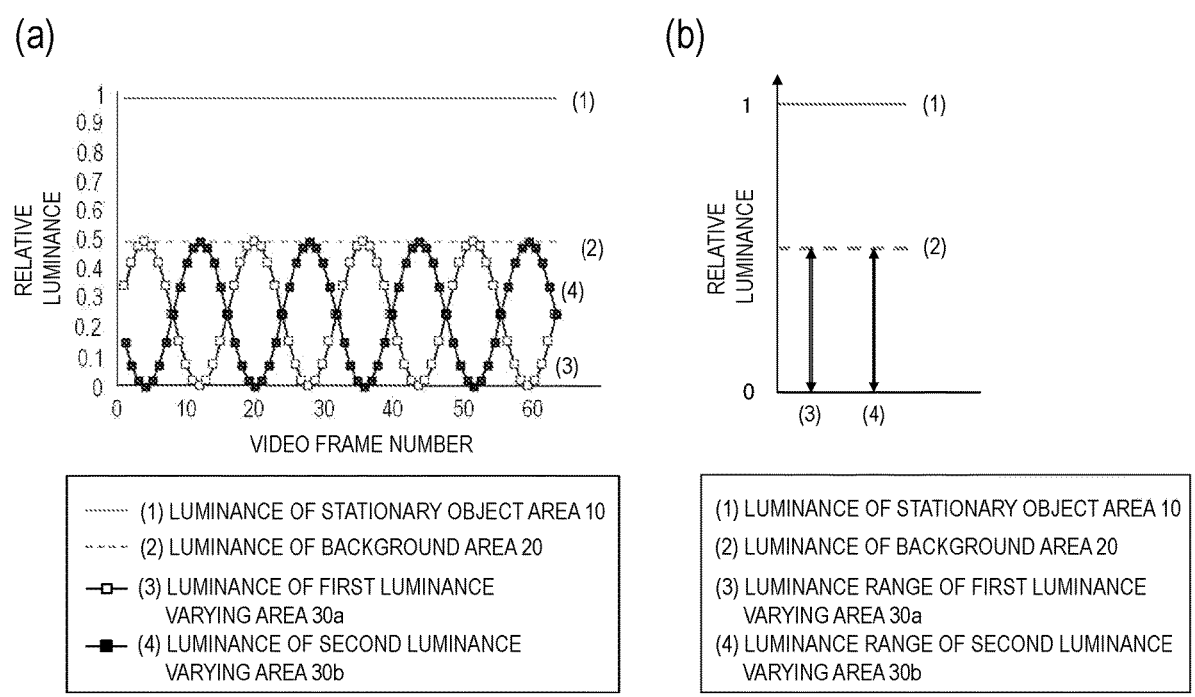
FIGS. 7(a)-(b) are diagrams illustrating the luminances of a stationary object area, a background area, the first luminance varying area, and the second luminance varying area included in video for presentation of the embodiments.

When the still image generation unit 110 sets the luminance of the stationary object area 10 and the luminance of the background area 20 so that the luminance of the stationary object area 10 is brighter than the luminance of the background area 20, the video generation unit 120 sets the maximum value of the time-varying luminance of a luminance varying area to a value smaller than or equal to the luminance of the background area 20, and sets the minimum value of the time-varying luminance of the luminance varying area to a value smaller than the maximum value of the time-varying luminance of the luminance varying area. That is, the maximum and minimum values of the time-varying luminance of the first luminance varying area 30*a* and the maximum and minimum values of the time-varying luminance of the second luminance varying area 30*b* are set to fall within the ranges of the arrows in FIG. 7(*b*), in which the axis of ordinates represents relative luminance in the case where the luminance of the stationary object area 10 is set to a relative luminance of 1, and a luminance value of 0 is set to a relative luminance of 0. FIG. 7(*a*) is a drawing showing the luminances of the stationary object area 10, the background area 20, the first luminance varying area 30*a*, and the second luminance varying area 30b included in the video 1 for presentation in a case where the maximum value of the luminance of the first luminance varying area 30a and the maximum value of the luminance of the second luminance varying area 30b are set to the same value as the luminance of the background area 20 the minimum value of the luminance of the first luminance varying area 30a and the minimum value of the luminance of the second luminance varying area 30b are set to 0, and the time variation in luminance of the first luminance varying area 30a and the time variation in luminance of the second luminance varying area 30b are set to be in a sine wave shape with a phase difference of 180 degrees (antiphase), with the axis of ordinates representing relative luminance in the case where the luminance of the stationary object area 10 is set to a relative luminance of 1, and a luminance value of 0 is set to a relative luminance of 0 and the axis of abscissas representing time. For example, in the case of this embodiment based on the first embodiment, setting the phase difference to 180 degrees in this way allows the viewer to feel as if the stationary object is moving to right and left, and for example, setting the phase difference between the periodic time variation in luminance of the first luminance varying area 30a and the periodic time variation in luminance of the second luminance varying area 30b to 0 degrees allows the viewer to feel the enlarging and reducing motion of the stationary object.

Figure 8:
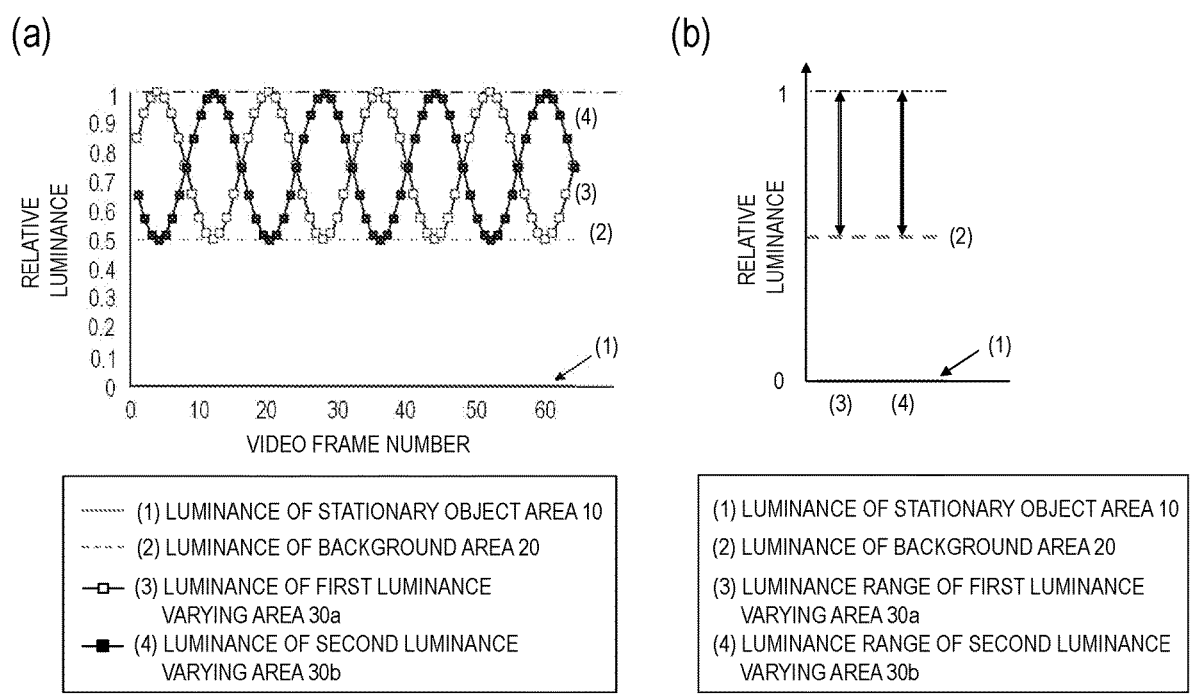
FIGS. 8(a)-(b) are diagrams illustrating the luminances of the stationary object area, the background area, the first luminance varying area, and the second luminance varying area included in video for presentation of the embodiments.

When the still image generation unit 110 sets the luminance of the stationary object area 10 and the luminance of the background area 20 so that the luminance of the stationary object area 10 is darker than the luminance of the background area 20, the video generation unit 120 sets the minimum value of the time-varying luminance of a luminance varying area to a value larger than or equal to the luminance of the background area 20, and the maximum value of the time-varying luminance of the luminance varying area to a value larger than the minimum value of the time-varying luminance of the luminance varying area. That is, the maximum and minimum values of the time-varying luminance of the first luminance varying area 30a and the maximum and minimum values of the time-varying luminance of the second luminance varying area 30b are set to fall within the ranges of the arrows in FIG. 8(b) with the axis of ordinates representing relative luminance in the case where the luminance of the stationary object area 10 is set to a relative luminance of 0, and the maximum representable luminance is set to a relative luminance of 1. FIG. 8(a) is a drawing showing the luminances of the stationary object area 10, the background area 20, the first luminance varying area 30a, and the second luminance varying area 30b included in the video 1 for presentation in a case where the minimum value of the luminance of the first luminance varying area 30a and the minimum value of the luminance of the second luminance varying area 30b are set to the same value as the luminance of the background area 20, the maximum value of the luminance of the first luminance varying area 30a and the maximum value of the luminance of the second luminance varying area 30b are set to the maximum representable luminance value, and the time variation in luminance of the first luminance varying area 30a and the time variation in luminance of the second luminance varying area 30b are set to be in a sine wave shape with a phase difference of 180 degrees (antiphase), with the axis of ordinates representing relative luminance in the case where the luminance of the stationary object area 10 is set to a relative luminance of 0, and the maximum representable luminance is set to a relative luminance of 1, and the axis of abscissas representing time. For example, in the case of this embodiment based on the second embodiment, setting the phase difference to 180 degrees in this way allows the viewer to feel as if the stationary object is moving to right and left. Further, for example, setting the phase difference between the periodic time variation in luminance of the first luminance varying area 30a and the periodic time variation in luminance of the second luminance varying area 30b to 0 degrees allows the viewer to feel the enlarging and reducing motion of the stationary object.

Figure 9:
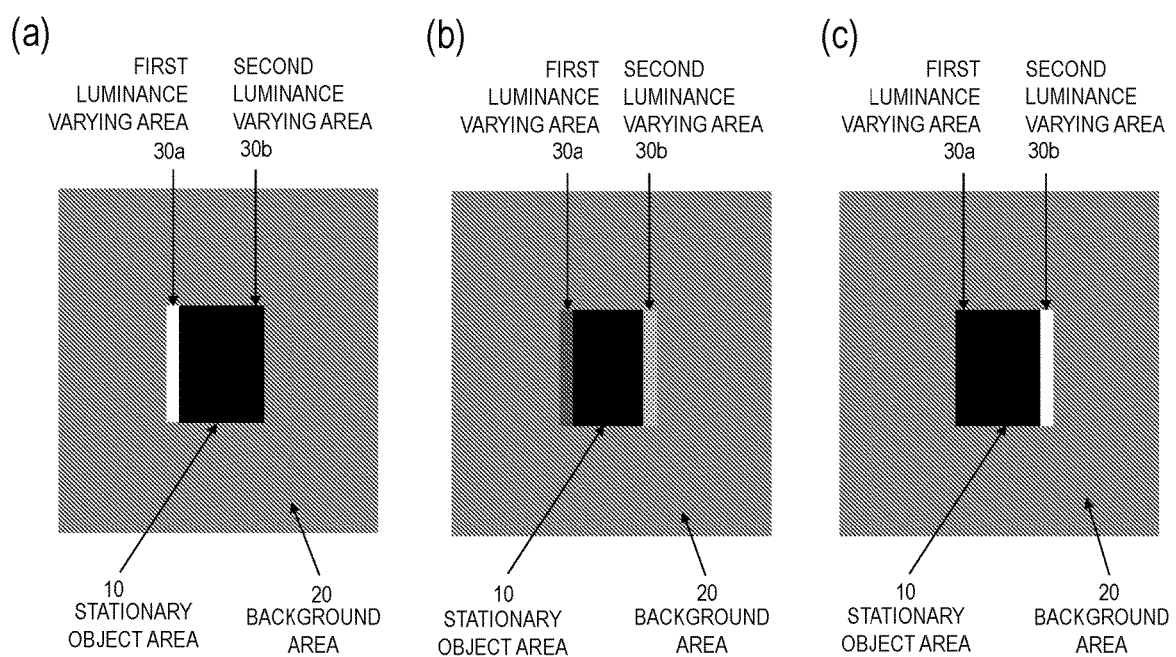
FIGS. 9(a)-(c) are schematic diagrams illustrating images that are temporally continuously displayed at the same spatial position.
Figures 1, 16:
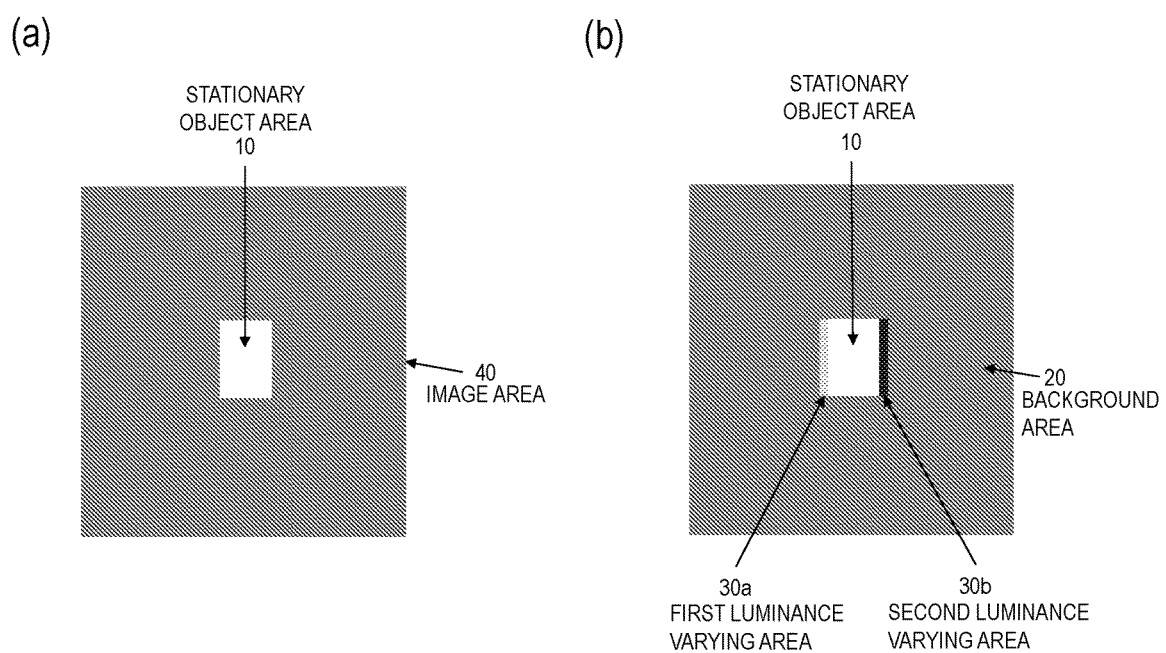
Figures 2, 16:
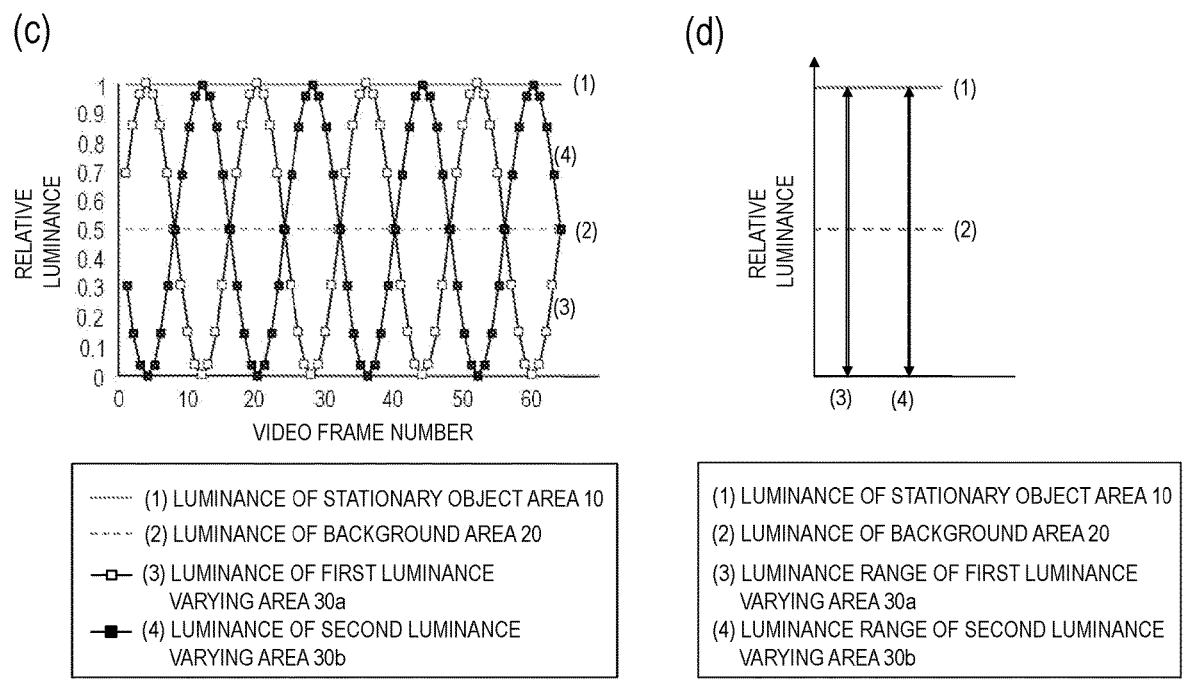
Figures 1, 17:
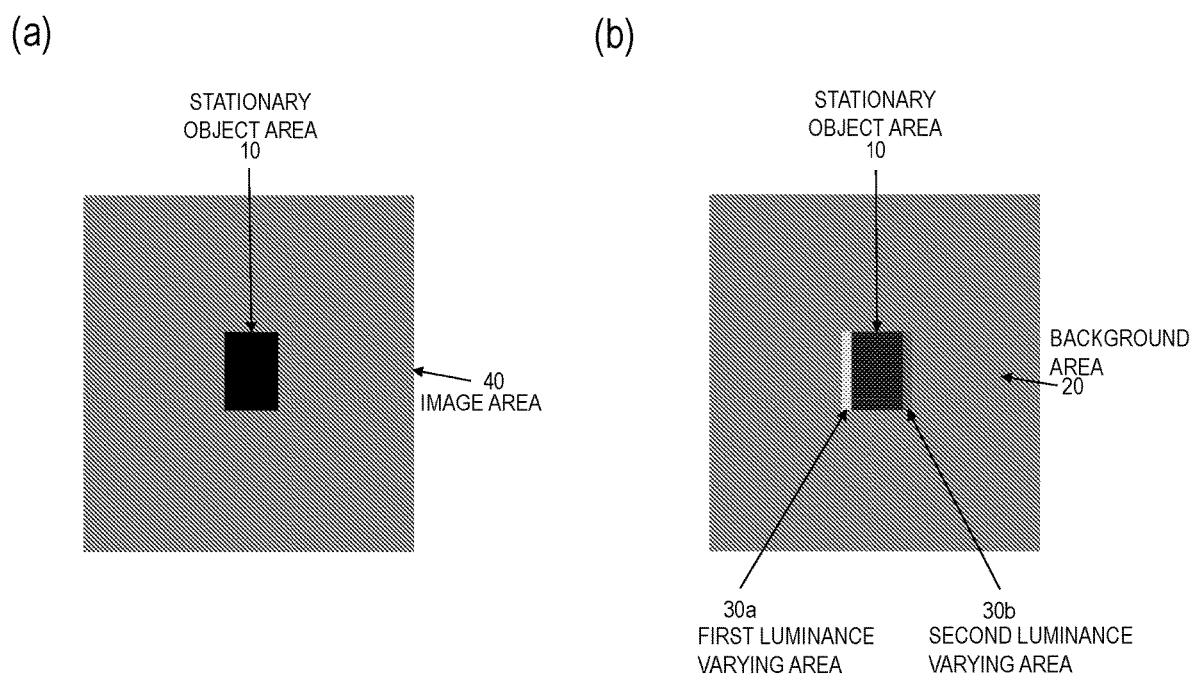
Figures 2, 17:
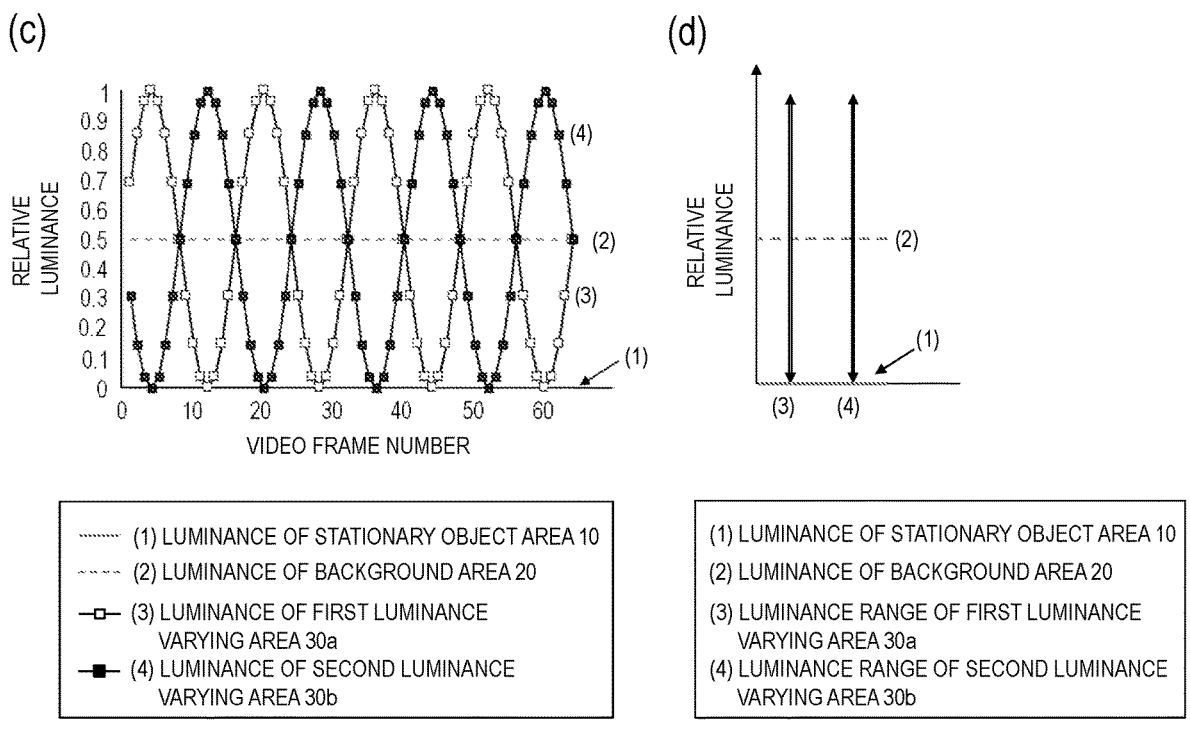

A case will be described where the luminance of the first luminance varying area 30a and the luminance of the second luminance varying area 30b are varied with time as shown in FIG. 16(c) and FIG. 17(c). In this case, when the luminances of the stationary object area 10 and the first luminance varying area 30a have become equal, a feeling is given that the stationary object is moving in the direction of the first luminance varying area 30a. In this case, when the luminances of the stationary object area 10 and the second luminance varying area 30b have become equal, a feeling is given that the stationary object is moving in the direction of the second luminance varying area 30b. It is considered that this is because an apparent motion occurs, which is generally famous as a motion representation in animation. When the three video frames in FIG. 9 are temporally consecutively displayed at the same spatial position in the order of (a), (b), and (c), the luminance of the second luminance varying area 30b adjacent to the right side of the stationary object area 10 is equal to the luminance of the stationary object area 10 in FIG. 9(a) which is the first frame, so that the stationary object looks closer to the right. Thereafter, from FIG. 9(a) which is the first frame through FIG. 9(b) which is the second frame to FIG. 9(c) which is the third frame, the luminance of the second luminance varying area 30b gets farther from the luminance of the stationary object area 10, the luminance of the first luminance varying area 30a gets closer to the luminance of the stationary object area 10, and in FIG. 9(c) which is the third frame, the luminance of the first luminance varying area 30a adjacent to the left side of the stationary object area 10 is equal to the luminance of the stationary object area 10, so that the stationary object looks closer to the left. It is considered that the stationary object is perceived to be moving by continuously perceiving this apparent positional movement. Since FIG. 9(a) corresponds to the frame number of 4 in FIG. 17(c), FIG. 9(b) corresponds to the frame number of 10 in FIG. 17(c), and FIG. 9(c) corresponds to the frame number of 12 in FIG. 17(c), it is considered that, by varying with time the luminance of the first luminance varying area 30a and the luminance of the second luminance varying area 30b as shown in FIG. 17(c), a feeling is given that the stationary object is periodically moving to right and left. The same applies to FIG. 16 as well as FIG. 17. However, the feature of this embodiment is to be able to give a feeling that the stationary object is moving even when the apparent motion is not established between the stationary object and the luminance varying area.

Note that when the overlapping area is set as the third luminance varying area 30c in step S1201, the video generation unit 120 generates and outputs the video 1 for presentation in the manner described below, as described in the first embodiment. Here, in addition to varying with time the luminance of the first luminance varying area 30a and the luminance of the third luminance varying area 30b as described above, the video generation unit 120 sets the average value of the luminance of the first luminance varying area 30a and the luminance of the second luminance varying area 30b as the luminance of the third luminance varying area 30c at each time. When the time variation in luminance of the first luminance varying area 30a and the time variation in luminance of the second luminance varying area 30b are set to have the same amplitude and to be in antiphase as described in the first embodiment, the luminance of the third luminance varying area 30c does not vary with time exceptionally.

Sixth Embodiment

Figure 10:
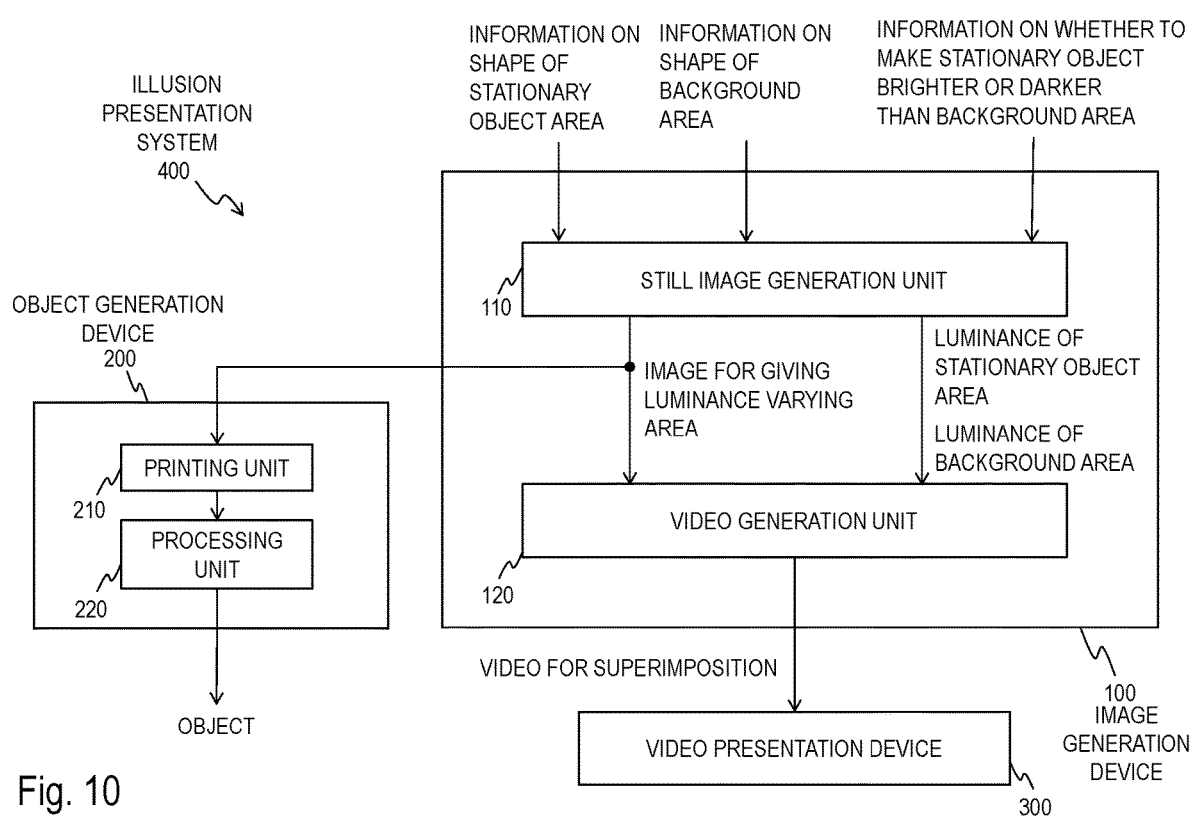
FIG. 10 is a block diagram for illustrating an illusion showing system of a sixth embodiment.
Figure 11:
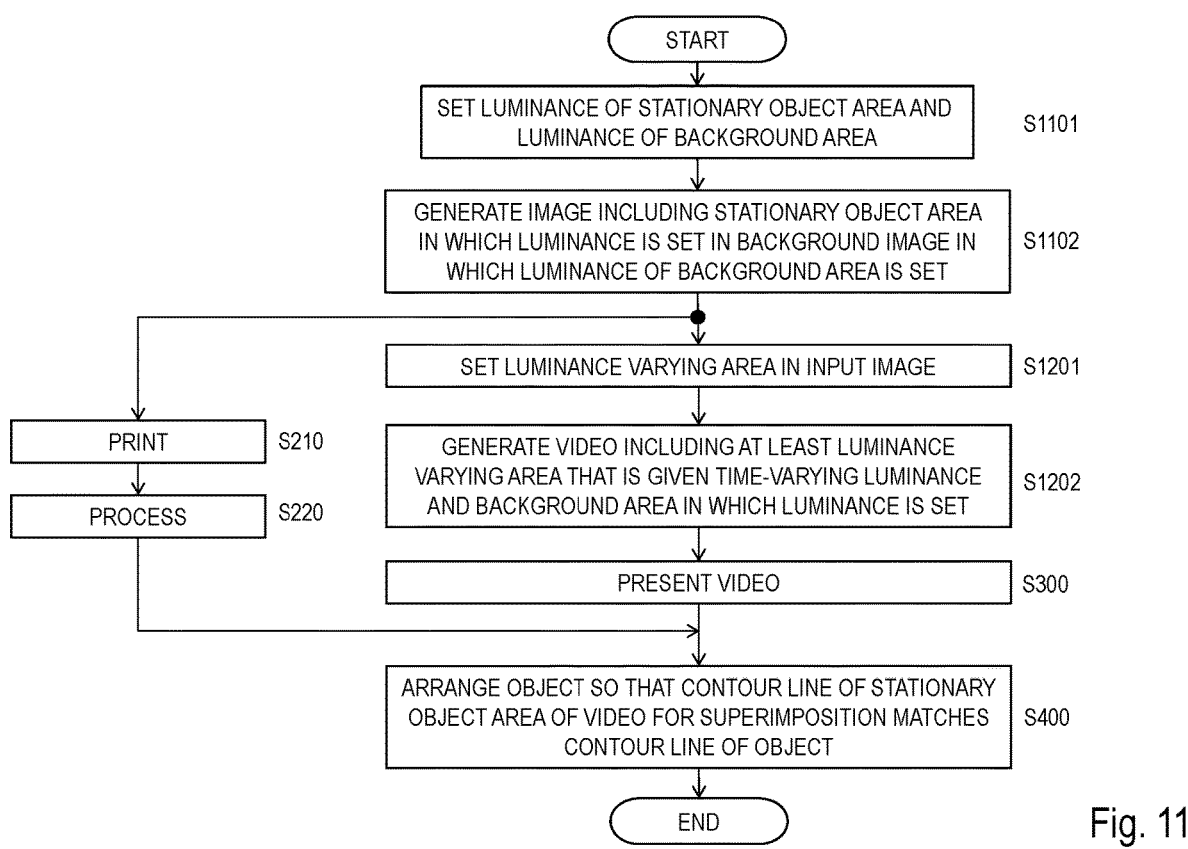
FIG. 11 is a flow diagram for illustrating an illusion presenting method of the sixth embodiment.

In a sixth embodiment, an embodiment will be described that gives a feeling that a stationary object, which is a real object, is moving. As illustrated in FIG. 10, an illusion showing system 400 of the sixth embodiment includes an image generation device 100, an object generation device 200, and a video presentation device 300. The image generation device 100 comprises a still image generation unit 110 and a video generation unit 120. The object generation device 200 comprises at least a printing unit 210 and may comprise a processing unit 220. Differences of the operation of the illusion showing system 400 from those of the respective embodiments and their modifications described above will be described below with further reference to FIG. 11.

<<Image Generation Device 100>>

As illustrated in FIG. 10, the image generation device 100 of this embodiment generates and outputs an image 1' for giving luminance varying areas and video 4 for superimposition.

The still image generation unit 110 performs the same operation as in any of the respective embodiments and their modifications described above to generate and output the image 1' for giving luminance varying areas (step S1101, step S1102). In this embodiment, the image 1' for giving luminance varying areas is also output to the outside of the image generation device 100 and is input to the object generation device 200.

The video generation unit 120 outputs video generated by performing the same operation as in any of the respective embodiments and their modifications described above as the video 4 for superimposition, or outputs video generated by performing the same operation as in any of the respective embodiments and their modifications described above as well as setting the luminance value of the luminance of the stationary object area 10 to 0 as the video 4 for superimposition, (step S1201, step S1202). When a CRT display or an LCD display is used as the video presentation device 300, the video generation unit 120 may perform either operation, but when a video projector is used as the video presentation device 300, the video generation unit 120 needs to perform the latter operation.

<<Object Generation Device 200>>

The image 1' for giving luminance varying areas that is output from the image generation device 100 is input to the printing unit 210. The printing unit 210 obtains and outputs a printed matter that is obtained by printing the input image 1' for giving luminance varying areas on a plane made of paper, wood, cloth, glass, synthetic resin, metal, or the like (step S210).

The printed matter output from the printing unit 210 is input to the processing unit 220. For example, the processing unit 220 keeps the area where the stationary object area 10 is printed in the printed matter as it is and removes the remaining area to obtain and output an object 60 having substantially the same contour as the contour of the stationary object area 10 (step S220).

Note that using a well-known printer not provided with the processing unit 220 as the object generation device 200, the user may cut out the area where the stationary object area 10 is printed in the printed matter along the contour line of the stationary object area 10 to obtain the object 60 having substantially the same contour as the contour of the stationary object area 10.

<<Video Presentation Device 300>>

The video 4 for superimposition that is generated and output by the image generation device 100 is input to the video presentation device 300. The video presentation device 300 is, for example, a CRT display, an LCD display, or a video projector. For example, when using a video presentation device 300 provided with a screen such as a CRT display or an LCD display, the video presentation device 300 displays the input video 4 for superimposition on the screen provided in the video presentation device 300. Further, when using a video projector as the video presentation device 300, the video presentation device 300 projects the input video 4 for superimposition onto a projection surface such as a screen to display the video 4 for superimposition on the projection surface such as a screen (step S300).

<<Illusion Showing Method>>

Figure 12:
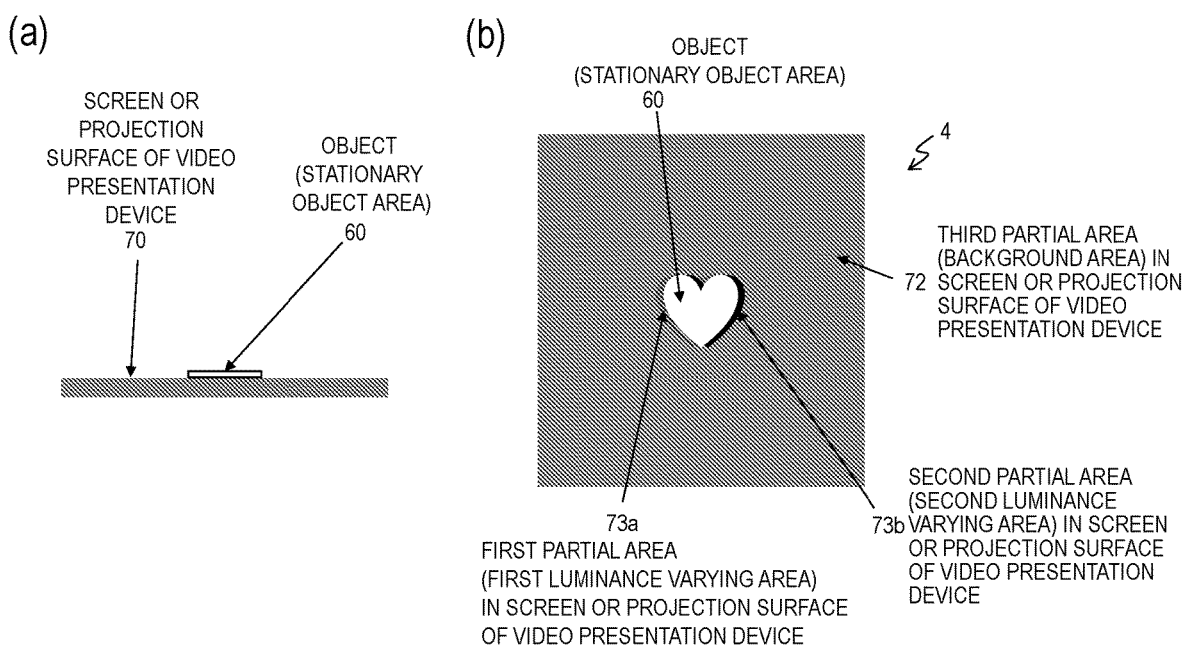
FIGS. 12(a)-(b) are schematic diagrams illustrating a state in which an object is placed on a screen or projection surface of a video presentation device.

In this embodiment, as shown in FIG. 12(a), which is a side view of the screen or projection surface 70, and FIG. 12(b), which is a front view of the screen or projection surface 70, the object 60 is arranged on the screen or projection surface 70 of the video presentation device 300 so that the contour line of the stationary object area 10 of the displayed video 4 for superimposition substantially matches the contour line of the object 60 (step S400). In the case of such arrangement, as for the area where the object 60 is arranged in the visually recognized area, not the luminance of the stationary object area 10 included in the video 4 for superimposition presented by the video presentation device 300 but the luminance of the object 60, that is, the luminance of the stationary object area 10 printed on the object 60 is visually recognized. On the other hand, since the screen or projection surface 70 of the video presentation device 300 is visually recognized in the area where the object 60 is not arranged, the area is composed of a first partial area 73a where the time-varying luminance of the first luminance varying area 30a included in the video 4 for superimposition presented by the video presentation device 300 is visually recognized, a second partial area 73b where the time-varying luminance of the second luminance varying area 30b included in the video 4 for superimposition presented by the video presentation device 300 is visually recognized, and a third partial area 72 where the luminance of the background area 20 included in the video 4 for superimposition is visually recognized. This can make the stationary object printed on the object 60 seem to be moving. Note that since the luminance of the stationary object area 10 included in the video 4 for superimposition is constant and the luminances of the first luminance varying area 30a and the second luminance varying area 30b included in the video 4 for superimposition change with time, the contour line of the stationary object area 10 of the displayed video 4 for superimposition can be easily matched with the contour line of the object 60.

Seventh Embodiment

Figure 13:
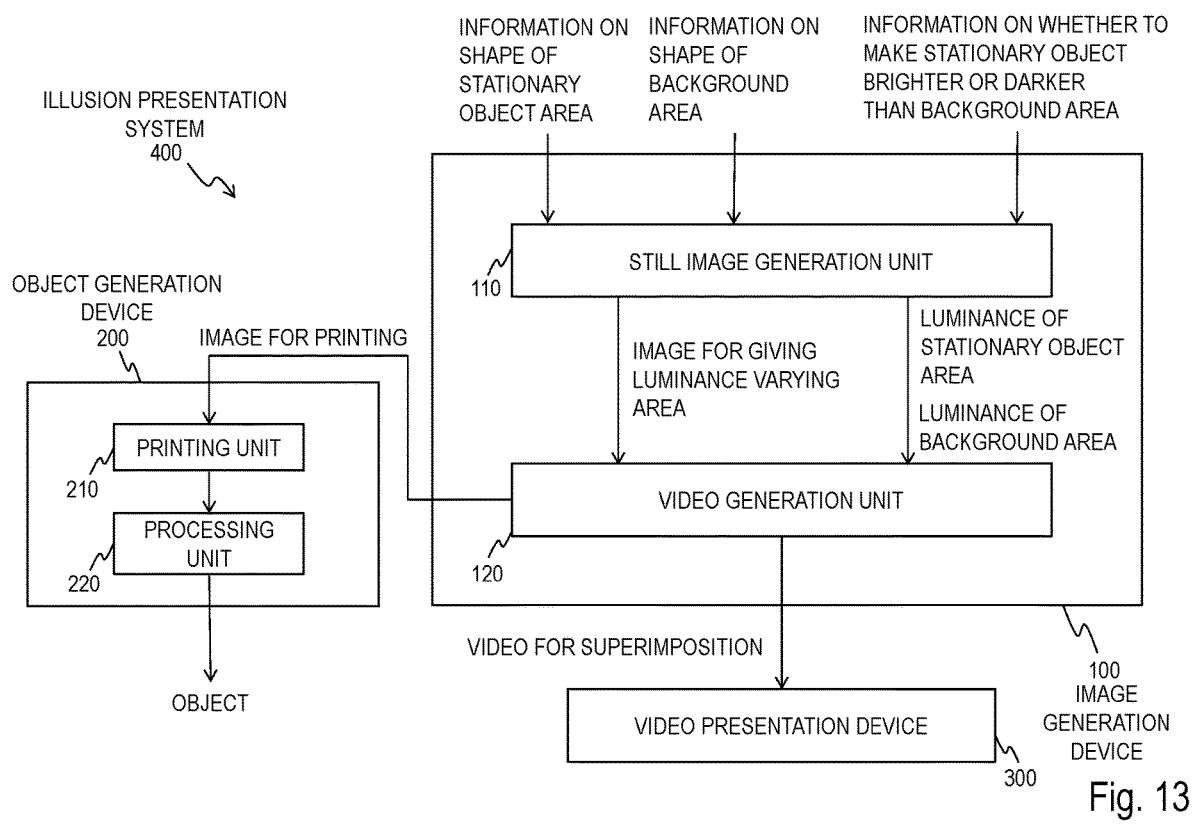
FIG. 13 is a block diagram for illustrating an illusion showing system of a seventh embodiment.
Figure 14:
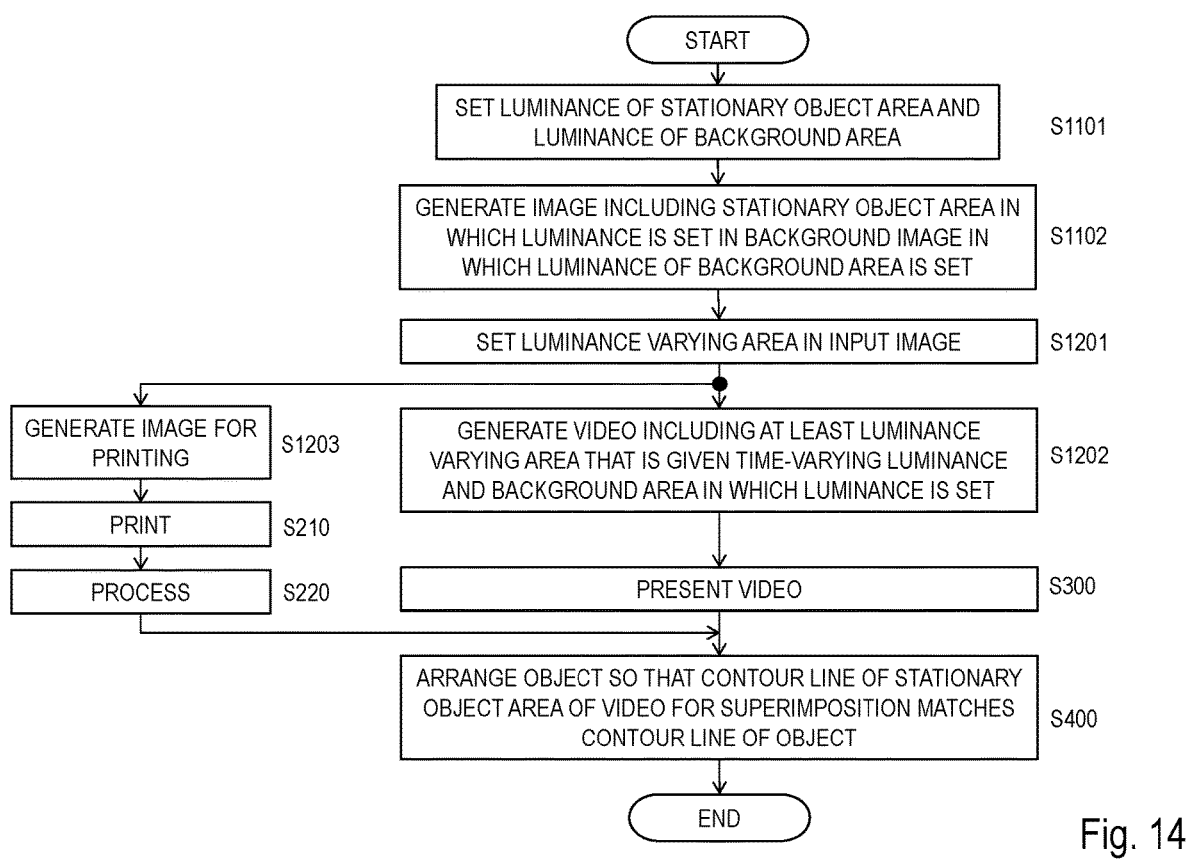
FIG. 14 is a flow diagram for illustrating an illusion presenting method of the seventh embodiment.

In a seventh embodiment, another embodiment will be described that gives a feeling that a stationary object, which is a real object, is moving. Although the sixth embodiment is an embodiment in which the stationary object is a printed real object and the luminance varying areas and the background area are displayed on the screen or on the projection surface, this embodiment is an embodiment in which the stationary object and the background area are printed real objects and the luminance varying areas are displayed on the screen or on the projection surface. As illustrated in FIG. 13, an illusion showing system 400 of the seventh embodiment includes an image generation device 100, an object generation device 200, and a video presentation device 300. The image generation device 100 comprises a still image generation unit 110 and a video generation unit 120. The object generation device 200 comprises at least a printing unit 210, and may comprise a processing unit 220. Differences of the operation of the illusion showing system 400 from those of the first embodiment to the fourth embodiment, their modifications and the fifth embodiment will be described below with further reference to FIG. 14.

<<Image Generation Device 100>>

As illustrated in FIG. 13, the image generation device 100 of this embodiment generates and outputs an image for printing and video 4 for superimposition.

The still image generation unit 110 performs the same operation as in any of the first embodiment to the fourth embodiment, their modifications and the fifth embodiment to generate and output an image 1' for giving luminance varying areas (step S1101, step S1102).

The video generation unit 120 outputs, as the video 4 for superimposition, video generated by performing the same operation as in any of the first embodiment to the fourth embodiment, their modifications and the fifth embodiment, or outputs, as the video 4 for superimposition, video generated by performing the same operation as in any of the first embodiment to the fourth embodiment, their modifications and the fifth embodiment as well as setting the luminance value of the luminance of at least either the stationary object area 10 or the background area 20 to 0 (step S1201, step S1202). When a CRT display or an LCD display is used as the video presentation device 300, the video generation unit 120 may perform either operation, but when a video projector is used as the video presentation device 300, the video generation unit 120 needs to output, as the video 4 for superimposition, video generated by performing the same operation as in any of the first embodiment to the fourth embodiment, their modifications and the fifth embodiment as well as setting the luminance values of the luminances of both the stationary object area 10 and the background area 20 to 0.

Further, the video generation unit 120 generates and outputs, as an image for printing, an image in which the luminance varying areas set in step S1201 are made distinguishable from the stationary object area 10 and the background area 20 in the image 1' for giving luminance varying areas input from the still image generation unit 110 (step S1203). For example, the video generation unit 120 generates and outputs, as an image for printing, an image in which a luminance different from those of the stationary object area 10 and the background area 20 is set in the areas corresponding to the first luminance varying area 30a and the second luminance varying area 30b in the image 1' for giving luminance varying areas. Further, when the third luminance varying area 30c is also set in step S1201, the video generation unit 120 generates and outputs, as an image for printing, an image in which the luminance different from those of the stationary object area 10 and the background area 20 is also set in the area corresponding to the third luminance varying area 30c.

<<Object Generation Device 200>>

The image for printing that is output from the image generation device 100 is input to the printing unit 210. The printing unit 210 obtains and outputs a printed matter that is obtained by printing the input image for printing on a plane made of paper, wood, cloth, glass, synthetic resin, metal, or the like (step S210).

The printed matter output from the printing unit 210 is input to the processing unit 220. The processing unit 220 keeps the area where the stationary object area 10 is printed and the area where the background area 20 is printed in the printed matter as they are, and, for example, removes the areas corresponding to the first luminance varying area 30a and the second luminance varying area 30b, as well as, for example, removing the area corresponding to the third luminance varying area 30c when there is the area corresponding to the third luminance varying area 30c to output an object 80 obtained by processing the areas corresponding to the luminance varying areas to transmit light (step S220).

Note that using a well-known printer not provided with the processing unit 220 as the object generation device 200, the user may process the areas corresponding to the luminance varying areas to transmit light to obtain the object 80 by keeping the area where the stationary object area 10 is printed and the area where the background area 20 is printed in the printed material as they are and, for example, removing the areas corresponding to the first luminance varying area 30a and the second luminance varying area 30b by cutting them out, or by removing the area corresponding to the third luminance varying area 30c as well when there is the third luminance varying area 30c <<Video Presentation Device 300>>

The video 4 for superimposition that is generated and output by the image generation device 100 is input to the video presentation device 300. The video presentation device 300 is, for example, a CRT display, an LCD display, or a video projector. For example, when using a video presentation device 300 provided with a screen such as a CRT display or an LCD display, the video presentation device 300 displays the input video 4 for superimposition on the screen provided in the video presentation device 300. Further, when using a video projector as the video presentation device 300, the video presentation device 300 projects the input video 4 for superimposition onto a projection surface such as a screen to display the video 4 for superimposition on the projection surface such as a screen (step S300).

<<Illusion Showing Method>>

Figure 15:
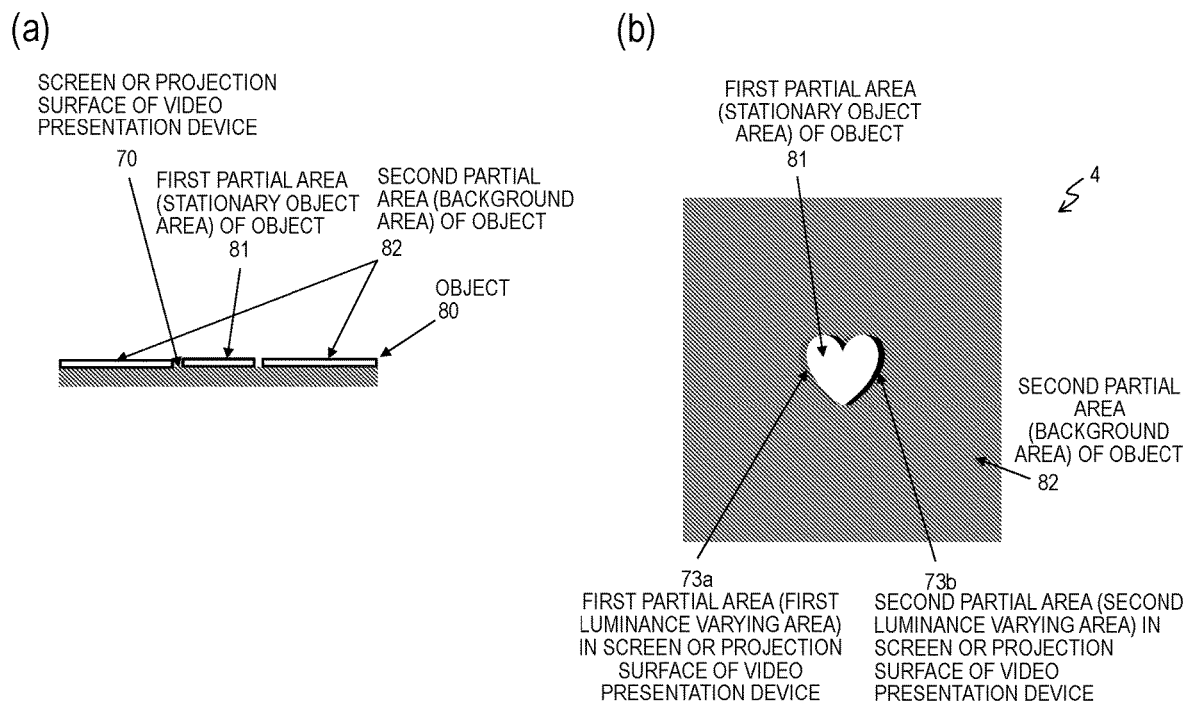
FIGS. 15(a)-(b) are schematic diagrams illustrating a state in which an object is placed on the screen or projection surface of a video presentation device.

In this embodiment, as shown in FIG. 15(a), which is a cross-sectional view orthogonal to the screen or projection surface 70, and FIG. 15(b), which is a front view of the screen or projection surface 70, the object 80 is arranged on the screen or projection surface 70 of the video presentation device 300 so that the contour line of the stationary object area 10 of the displayed video 4 for superimposition substantially matches the contour line of an area 81 where the stationary object area 10 is printed in the object 80 (a first partial area 81 of the object) (step S400). In the case of such arrangement, as for the area where the object 80 is arranged in the visible area and which is not processed to transmit light, not the luminance of the stationary object area 10 included in the video 4 for superimposition presented by the video presentation device 300 but the luminance of the object 80 is visually recognized. That is, as for the first partial area 81 of the object, the luminance of the stationary object area 10 printed on the object 80 is visually recognized. Further, as for the area where the background area 20 is printed in the object 80 (a second partial area 82 of the object), the luminance of the background area 20 printed on the object 80 is visually recognized. On the other hand, since the screen or projection surface 70 of the video presentation device 300 is visually recognized as for the area where the object 80 is not arranged and the areas where the object 80 is arranged but which is processed to transmit light, they are composed of a first partial area 73*a* in which the time-varying luminance of the first luminance varying area 30*a* included in the video 4 for superimposition presented by the video presentation device 300 is visually recognized and a second partial area 73*b* in which the time-varying luminance of the second luminance varying area 30*b* is visually recognized. This makes it possible to give a feeling that the stationary object printed on the object 80 is moving. Note that since the luminance of the stationary object area 10 included in the video 4 for superimposition is constant and the luminances of the first luminance varying area 30*a* and the second luminance varying area 30*b* included in the video 4 for superimposition change with time, the contour line of the stationary object area 10 of the displayed video 4 for superimposition can be easily matched with the contour line of the area 81 where the stationary object area 10 is printed in the object 80.

[Other Modifications]

The present invention is not limited to the above-described embodiments and their modifications. For example, the luminances in the stationary object area 10 may or may not be uniform. That is, the figure drawn by the still image generation unit 110 in step S1102-2 has only to have the average luminance equal to the luminance of the stationary object area 10 set in step S1101, the luminances of all the pixels in the figure may be the same, or the luminances may be different between the pixels in the figure because of, for example, containing a pattern or picture. Further, the colors in the stationary object area 10 may or may not be uniform.

Further, the luminances in the background area 20 may or may not be uniform. That is, the background image generated by the still image generation unit 110 in step S1102-1 has only to have the average luminance equal to the luminance of the background area 20 set in step S1101, the luminances of all the pixels in the background image may be the same, or the luminances may be different between the pixels in the background image because of, for example, containing a pattern or picture. Further, the colors in the background area 20 may or may not be uniform.

For example, when a figure containing a pattern or picture is used as the stationary object area 10, a stationary object image that is an image to be used as the stationary object area 10 may be input from the unillustrated input means provided in the image generation device 100, and the still image generation unit 110 may determine the average luminance of the input stationary object image and set the determined average luminance of the stationary object image as the luminance of the stationary object area 10 in step S1101, and draw the input stationary object image near the center of the background image to generate the image 1' for giving luminance varying areas in step S1102-2.

Further, for example, when the background area 20 is set to contain a pattern or picture, a background image may be input from the unillustrated input means provided in the image generation device 100, and the still image generation unit 110 may determine the average luminance of the input background image and set the determined average luminance of the background image as the luminance of the background area 20 in step S1101, omit step S1102-1 for generating the background image, and use the input background image in step S1102-2 instead of the background image generated in step S1102-1.

Note that when a figure containing a pattern or picture is used as the stationary object area 10 and the background area 20 is set to contain a pattern or picture, the video generation unit 120 may vary with time the luminances of the first luminance varying area 30*a* and the second luminance varying area 30*b* in step S1202 as described in the first embodiment or as described in the fifth embodiment as the processing in the case of setting the luminance of the stationary object area 10 and the luminance of the background area 20 so that the luminance of the stationary object area 10 is brighter than the luminance of the background area 20 when the luminance of the stationary object area 10 set in step S1101 is brighter than the luminance of the background area 20, and as described in the second embodiment or as described in the fifth embodiment as the processing in the case of setting the luminance of the stationary object area 10 and the luminance of the background area 20 so that the luminance of the stationary object area 10 is darker than the luminance of the background area 20 when the luminance of the stationary object area 10 set in step S1101 is darker than the luminance of the background area 20.

Further, although the luminances in a luminance varying area are preferably uniform, they may not necessarily be uniform. That is, although the luminances in each luminance varying area that are varied with time by the video generation unit 120 in step S1202 are preferably the same luminance for all pixels in each luminance varying area at each time, there may be a difference in luminance between pixels in each luminance varying area at each time. Further, the colors in each luminance varying area may or may not be uniform.

In addition, the above-described various processes may be executed not only in time series according to the description but also in parallel or individually according to the processing capability of the device that executes the processes or as needed. Needless to say, other changes can be made as appropriate without departing from the spirit of the present invention.

[Hardware and Program]

The above-described image generation device is configured, for example, through execution of a predetermined program by a general-purpose or special-purpose computer comprising a processor (hardware processor) such as a CPU (central processing unit) and a memory such as a RAM (random-access memory) and a ROM (read-only memory). This computer may comprise one processor and one memory, or may comprise a plurality of processors and a plurality of memories. This program may be installed in a computer or may be recorded in advance in a ROM or the like. Further, some or all of the processing units may be configured using electronic circuitry that realizes a processing function without using a program, rather than electronic circuitry that realizes a functional configuration by reading a program like a CPU. Electronic circuitry that constitutes one image generation device may include a plurality of CPUs.

When the configuration of the image generation device described above is realized by a computer, the processing contents of the functions that the image generation device should have are written in a program. By executing this program on a computer, the above-described processing functions are realized on the computer. The program in which the processing contents are written can be recorded in a computer-readable recording medium. An example of a computer-readable recording medium is a non-transitory recording medium. Examples of such a recording medium include a magnetic recording device, an optical disc, a magneto-optical recording medium, a semiconductor memory and the like.

This program is distributed by, for example, selling, transferring, or lending a portable recording medium such as a DVD or a CD-ROM in which the program is recorded. Further, a configuration is possible in which this program is distributed by storing this program in a storage device of a server computer in advance, and transferring the program from the server computer to another computer via a network.

For example, a computer that executes such a program first temporarily stores the program recorded on a portable recording medium or the program transferred from the server computer in its own storage device. When executing a process, this computer reads the program stored in its own storage device, and executes a process according to the read program. As another execution form of this program, the computer may directly read the program from the portable recording medium and execute a process according to the program, and further, each time a program is transferred from the server computer to this computer, a process according to the received program may be executed sequentially. A configuration is possible in which the above-described processes are executed by a so-called ASP (application service provider) type service that does not transfer the program from the server computer to this computer but realizes a processing function only by its execution instruction and acquisition of results.

Instead of realizing the processing functions of the present device by executing a predetermined program on the computer, at least a part of these processing functions may be realized by hardware.

[Summary]

As described above, the image generation device 100 of each embodiment generates video 1 for presentation or video 4 for superimposition (video) including a stationary object area 10, at least one luminance varying area 30*a*, 30*b*, 30*c* located along a contour of the stationary object area 10, and a background area 20 other than the stationary object area 10 and the luminance varying area 30*a*, 30*b*, 30*c*. Here, luminance of the luminance varying area 30*a*, 30*b*, 30*c* varies with time in a luminance range based on luminance of the stationary object area 10 and luminance of the background area 20. The luminance varying area 30*a*, 30*b*, 30*c* is a portion that does not overlap the stationary object area 10 in at least one area obtained by moving and/or enlarging the stationary object area 10. The movement of the stationary object area 10 may be translational movement of each point included in the stationary object area 10 as illustrated in the first and second embodiments, may be rotation of the stationary object area 10 as illustrated in the third embodiment, or may be a combination of translational movement of each point included in the stationary object area 10 and rotation of the stationary object area 10. For example, the luminance varying area 30*a*, 30*b*, 30*c* (A) may be a portion that does not overlap the stationary object area 10 in one or a plurality of areas obtained by translating each point included in the stationary object area 10, (B) may be a portion that does not overlap the stationary object area 10 in one or more areas obtained by rotating the stationary object area 10 about one or more points, respectively, or (C) may be a portion that does not overlap the stationary object area 10 in one or more areas obtained by translating each point included in the stationary object area 10 and rotating it about one or more points, respectively. Note that the movement of the stationary object area 10 may target one or a plurality of partial areas included in the stationary object area 10. In this case, the movement of each partial area may be translational movement of each point in the partial area, may be rotation of the partial area, or may be a combination of translational movement of each point and rotation of the partial area.

As illustrated in the first and second embodiments, for example, the at least one luminance varying area are two luminance varying areas, which are a first luminance varying area 30*a* that is an area that does not overlap the stationary object area 10 in an area obtained by moving the stationary object area 10 in a certain direction by a first movement amount (a movement amount $D_L$), and a second luminance varying area 30*b* that is an area that does not overlap the stationary object area 10 in an area obtained by moving the stationary object area 10 in a direction opposite to the direction by a second movement amount (a movement amount $D_R$). Here, from the fact that it is desirable to set both the viewing angles of the first luminance varying area 30*a* and the second luminance varying area 30*b* when viewed from a certain distance to 0.2 degrees or its vicinity, it is desirable that the first movement amount and the second movement amount are substantially equal. Alternatively, as illustrated in the third embodiment, for example, the at least one luminance varying area are two luminance varying areas, which are a first luminance varying area 30*a* that does not overlap the stationary object area 10 in an area obtained by rotating the stationary object area 10 about a certain point in a certain direction by a first rotation amount (a rotation amount $\theta_L$), and a second luminance varying area 30*b* that does not overlap the stationary object area 10 in an area obtained by rotating the stationary object area 10 about the point in a direction opposite to the direction by a second rotation amount (a rotation amount $\theta_R$). Here, from the fact that it is desirable to set both the viewing angles of the first luminance varying area 30*a* and the second luminance varying area 30*b* when viewed from a certain distance to 0.2 degrees or its vicinity, it is desirable that the first rotation amount and the second rotation amount are substantially equal. Alternatively, as illustrated in the fourth embodiment, for example, the luminance varying area is a portion that does not overlap the stationary object area 10 in at least one area obtained by enlarging the stationary object area 10.

As illustrated in the fifth embodiment, for example, (1) luminance of the stationary object area 10 is brighter than luminance of the background area 20, and a maximum value of luminance of the luminance varying area 30*a*, 30*b*, 30*c* is smaller than or equal to luminance of the background area 20. Alternatively, (2) luminance of the stationary object area 10 is darker than luminance of the background area 20, and a minimum value of luminance of the luminance varying area 30*a*, 30*b*, 30*c* is higher than or equal to luminance of the background area 20.

As illustrated in the first to third embodiments, one stationary object area 10 may be provided with a plurality of luminance varying areas, or as illustrated in the modifications of the first embodiment to the third embodiment, one stationary object area 10 may be provided with only one luminance varying area 30*a*.

REFERENCE SIGNS LIST

100 Image generation device
300 Video presentation device
200 Object generation device
400 Illusion showing system

The invention claimed is:

1. An image generation device comprising processing circuitry configured to
generate video for giving a feeling that an object which is not actually moving is moving, the video including a stationary object area, at least one luminance varying area located along a contour of the stationary object area, and a background area other than the stationary object area and the luminance varying area, wherein:
luminance of the luminance varying area is uniform and varies with time in a luminance range based on average luminance of the stationary object area and average luminance of the background area;
the luminance varying area is a portion that does not overlap the stationary object area in at least one area obtained by moving and/or enlarging the stationary object area;
(1) when average luminance of the stationary object area is brighter than average luminance of the background area, a maximum value of luminance of the luminance varying area is set to be smaller than or equal to average luminance of the background area; and
(2) when average luminance of the stationary object area is darker than average luminance of the background area, a minimum value of luminance of the luminance varying area is set to be higher than or equal to average luminance of the background area.

2. The image generation device according to claim 1, wherein:
the at least one luminance varying area are two luminance varying areas, which are a first luminance varying area that is an area that does not overlap the stationary object area in an area obtained by moving the stationary object area in a certain direction by a first movement amount, and a second luminance varying area that is an area that does not overlap the stationary object area in an area obtained by moving the stationary object area in a direction opposite to the direction by a second movement amount; and
the first movement amount and the second movement amount are substantially equal.

3. The image generation device according to claim 1, wherein:
the at least one luminance varying area are two luminance varying areas, which are a first luminance varying area that does not overlap the stationary object area in an area obtained by rotating the stationary object area about a certain point in a certain direction by a first rotation amount, and a second luminance varying area that does not overlap the stationary object area in an area obtained by rotating the stationary object area about the point in a direction opposite to the direction by a second rotation amount; and
the first rotation amount and the second rotation amount are substantially equal.

4. The image generation device according to claim 1, wherein
the luminance varying area is a portion that does not overlap the stationary object area in at least one area obtained by enlarging the stationary object area.

5. An image generation method comprising:
a step of generating video for giving a feeling that an object which is not actually moving is moving, the video including a stationary object area, at least one luminance varying area located along a contour of the stationary object area, and a background area other than the stationary object area and the luminance varying area, wherein:
luminance of the luminance varying area is uniform and varies with time in a luminance range based on average luminance of the stationary object area and average luminance of the background area; and
the luminance varying area is a portion that does not overlap the stationary object area in at least one area obtained by moving and/or enlarging the stationary object area;
(1) when average luminance of the stationary object area is brighter than average luminance of the background area, a maximum value of luminance of the luminance varying area is set to be smaller than or equal to average luminance of the background area; and
(2) when average luminance of the stationary object area is darker than average luminance of the background area, a minimum value of luminance of the luminance varying area is set to be higher than or equal to average luminance of the background area.

6. A non-transitory computer-readable recording medium storing a program for causing a computer to function as the image generation device according to claim 1.

* * * * *